(12) United States Patent
Manesh et al.

(10) Patent No.: US 8,666,825 B2
(45) Date of Patent: Mar. 4, 2014

(54) EMBEDDABLE DISTRIBUTED E-COMMERCE AND COMMUNITY BUILDING SYSTEM

(75) Inventors: Nasser K. Manesh, Mountain View, CA (US); Ahmad Kiarostami, San Francisco, CA (US)

(73) Assignee: Bay Photo, Inc., Scotts Valley, CA (US)

( * ) Notice: Subject to any disclaimer, the term of this patent is extended or adjusted under 35 U.S.C. 154(b) by 0 days.

(21) Appl. No.: 12/606,103

(22) Filed: Oct. 26, 2009

(65) Prior Publication Data
US 2010/0106565 A1    Apr. 29, 2010

Related U.S. Application Data

(60) Provisional application No. 61/108,826, filed on Oct. 27, 2008.

(51) Int. Cl.
*G06Q 30/00* (2012.01)
(52) U.S. Cl.
USPC ................................ 705/26.1; 705/27.1
(58) Field of Classification Search
USPC .................... 705/26, 27, 26.1–27.2
See application file for complete search history.

(56) References Cited

U.S. PATENT DOCUMENTS

| | | | | |
|---|---|---|---|---|
| 7,356,490 | B1* | 4/2008 | Jacobi et al. | 705/26.8 |
| 2002/0040395 | A1* | 4/2002 | Davis et al. | 709/224 |
| 2003/0204447 | A1* | 10/2003 | Dalzell et al. | 705/26 |
| 2005/0177453 | A1* | 8/2005 | Anton et al. | 705/26 |
| 2007/0073586 | A1* | 3/2007 | Dev et al. | 705/14 |
| 2008/0065995 | A1* | 3/2008 | Bell et al. | 715/751 |

OTHER PUBLICATIONS

Hudson, M. E., & Powell, E. (2000). Guide to E-shopping for office supplies: Part 1 of 2. Office Solutions, 17(1), 24-32.*

* cited by examiner

*Primary Examiner* — Resha Desai
(74) *Attorney, Agent, or Firm* — Donald R. Boys; Central Coast Patent Agency, Inc

(57) ABSTRACT

The present innovation provides a method and a system for embedding e-commerce and community building capability into a seller website, comprising maintaining on an e-commerce server a product database of products sold by a seller, providing a seller script that runs in a web browser for incorporation into at least one web page on the seller website, downloading upon execution of the seller script a dynamic page analyzer from the e-commerce server that, upon execution by the web browser, adds at least one toolbar to the web page, requesting by the web browser, a dynamic cart script, displaying a dynamic cart that enables the buyer to interactively specify an order for the product corresponding to the e-commerce control, and sending the specification of the order to the e-commerce server for fulfillment of the order.

20 Claims, 13 Drawing Sheets

FIG. 2B

| Print Sizes and Pricing | | | | | | |
|---|---|---|---|---|---|---|
| | DESCRIPTION | SIZE | | | PROFIT% | PRICE | OFFERED |
| ✦ | 6" Width | 6"x6" | 6"x7.5" | 6"x8" ... | 74.67 | US$15.00 | ☑ |
| ✦ | 8" Width | 8"x8" | 8"x10" | 8"x10.7" ... | 47.50 | US$6.00 | ☑ |
| ✦ | 9" to 10" Width | 10"x10" | 10"x12.5" | 9"x12" ... | 75.38 | US$40.00 | ☑ |
| ✦ | 12" Width | 12"x12" | 12"x15" | 12"x16" ... | 13.57 | US$14.00 | ☑ |
| ✦ | 16" to 18" Width | 16"x16" | 16"x20" | 18"x24" ... | 69.00 | US$100.00 | ☑ |
| ✦ | 20" Width | 20"x20" | 20"x25" | 20"x26.7" ... | 30.76 | US$46.00 | ☑ |
| ✦ | 24" Width | 24"x24" | 24"x30" | 24"x32" ... | | | ☐ |
| ✦ | 30" Width | 30"x30" | 30"x37.5" | 30"x40" ... | | | ☐ |

EMBEDDABLE DISTRIBUTED E-COMMERCE AND COMMUNITY BUILDING SYSTEM

REFERENCE TO RELATED APPLICATIONS

This application claims benefit of U.S. Provisional Application No. 61/108,826, entitled EMBEDDABLE DISTRIBUTED E-COMMERCE AND COMMUNITY BUILDING SYSTEM, filed on Oct. 27, 2008 by inventors Nasser K. Manesh and Ahmad Kiarostanni.

This application is related to applicants' co-pending application entitled EMBEDDABLE DISTRIBUTED E-COMMERCE AND COMMUNITY BUILDING SYSTEM FOR DIGITAL MEDIA, filed on the same date as this application by inventors Nasser K. Manesh and Ahmad Kiarostanni.

COPYRIGHT NOTICE

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

FIELD OF THE INVENTION

The present invention relates to e-commerce for digital media on blogs and websites. In particular, it provides systems and methods for licensing, and printing digital media and for selling products and services by embedding e-commerce widgets within blogs and websites. The invention provides, for existing blogs or websites that do not have built-in commerce capabilities, shopping carts as well as back-office processes attached to such shopping carts that enable visitors to make purchases.

BACKGROUND OF THE INVENTION

Advances in Internet technology such as blogging platforms and website creation tools makes it easy and inexpensive for people to build blogs and websites. Such ease of use and cost effectiveness has enabled many individuals without computer programming background to use the Internet as a medium to present their "creations" to the rest of the world. These creations may include inter alia digital media such as photos, videos, animations, and music, as well as physical items such as paintings, crafts, mechanical devices, sculptures, and hand-made greeting cards. Creations may include existing media such as photos or text either alone or in combination with created media, or only created media. In the case of physical items, the person usually presents his/her creations, or the creations of another person, using visual aids that include photos and videos of the actual item combined with descriptive text. It may be noted that the terms creation, media item, digital media item and item are henceforth used interchangeably.

In some cases individuals wish to sell their creations over the Internet, i.e. perform e-commerce. Typically, individuals, henceforth referred to as sellers, use an existing e-commerce website to sell their creations to avoid the cost and complexity of attempting to add e-commerce capability to their own personal blog or website. Examples of existing e-commerce websites that enable a seller to sell their creations include Amazon Marketplace and eBay. Amazon Marketplace is provided by Amazon Inc. of Seattle, Wash. eBay is provided by eBay Inc. of San Jose, Calif. Such existing e-commerce websites enable a seller to list items for sale and to provide descriptive information including text, photos, and videos on a web page provided by the e-commerce provider. The e-commerce provider also handles shopping carts, accepts online payments, provides the seller with sales reports, and makes payments to the seller after deducting any sales commissions.

The e-commerce provider, in effect, creates and manages a store for the seller. Amazon Marketplace and eBay includes the seller's items within an aggregated listing in a virtual store specific to the seller. These websites typically provide a search facility to help visitors to the website, also referred to as buyers, find what they are looking for. While such e-commerce websites attract large numbers of buyers, the seller is not able to offer their creations in the context of a highly personalized, boutique-style website. Thus there is a need to sell creations easily and efficiently from a seller's personal website or blog.

In some cases, the items are some type of digital content and the e-commerce provider handles payment and digital delivery. For example, micro-stock photography websites such as iStockPhoto, found on the web at www.istockphoto.com enable sellers, who are typically photographers, to upload their photos to a website and sell a license to use the uploaded photos to buyers who typically use the photos for commercial purposes. The sellers' photos are presented within aggregated lists and the buyer typically uses a search capability to find a particular photo. iStockPhoto is owned by Getty Images of Seattle, Wash.

Some e-commerce websites provide value added services for digital media such as photo printing. An example of such provider is ImageKind which enables sellers to upload photos to the ImageKind website and enables buyers to select and order framed prints of photos. ImageKind provides e-commerce services including offering a shopping cart and payment processing as well as fulfillment services such as printing of digital images and framing of printed digital images. ImageKind, Inc. is based in Seattle, Wash.

The common approach used by each of the abovementioned e-commerce services is that descriptive information about the items (photos, videos, text, etc) is uploaded to a third-party website separate from the seller's blog or personal website. The buyer must leave the seller's blog or website, and visit the third-party website in order to review items and place orders. For the seller this may result in losing customers and hence reduced sales and potentially reduced customer loyalty. In addition, maintaining multiple online sales outlets, e.g. a personal blog or website, and various e-commerce websites, is time-consuming for the seller.

Therefore, a system and method for adding e-commerce to a seller's website or blog such that a buyer may purchase a creation without leaving the seller's website or blog is desirable.

SUMMARY OF THE INVENTION

The present invention provides a system and method which enables a seller to easily add e-commerce services directly to his/her own website or blog. The invention provides product selection and shopping cart capabilities right on a seller's website. It also provides the back-office services required to fulfill the orders by integrating with various third party fulfillment services. As a result the seller gets a full service e-commerce solution on their own blog or website. The subject invention enables shoppers to select items at different websites and blog sites that also use the subject invention as their e-commerce solution. The e-commerce capabilities allow purchasing in various ways including inter alia direct purchase, auctioned purchase through bidding, purchase along with an escrow through a third-party, purchase by paying in installments, and deferred payment purchase.

The invention allows a seller to add community building features to his/her website or blog. Buyers can mark an item as their favorite, or rate the item. The invention collects the list of visitors who have shown interest in a product, visitors who have bought products, and gives the seller access to these lists so that they can later interact with their buyer community.

Each step of the sales process, from selection of the product to accepting payment from a buyer takes place on the seller website or blog, and the back-end processes such as printing and shipping are managed by the invention. No intervention or work must be performed by the seller. In short, the invention turns a seller's website or blog into a boutique where he/she can post photos to his/her website or blog, and generate sales of merchandise that incorporates the photos or the digital media items they represent or of the merchandise depicted in the photo, and collect a share of each sale. All steps related to sales of various forms of products from prints to licenses to merchandise are performed or managed by the invention. Further, the buyer only needs to interact with the seller's website or blog.

BRIEF DESCRIPTION OF THE DRAWINGS

The present invention will be more fully understood and appreciated from the following detailed description, taken in conjunction with the drawings in which:

FIG. 2B is an example user interface that enables a buyer to specify printing options for a digital image, in accordance with an embodiment of the present invention;

FIG. 4C is an example user interface for a seller portal that enables a seller to specify the price for a product, in accordance with an embodiment of the present invention;

FIG. 5A is an example user interface for a buyer portal that enables a buyer to view a list of orders he/she has placed, in accordance with an embodiment of the present invention;

DETAILED DESCRIPTION

Figure 1:
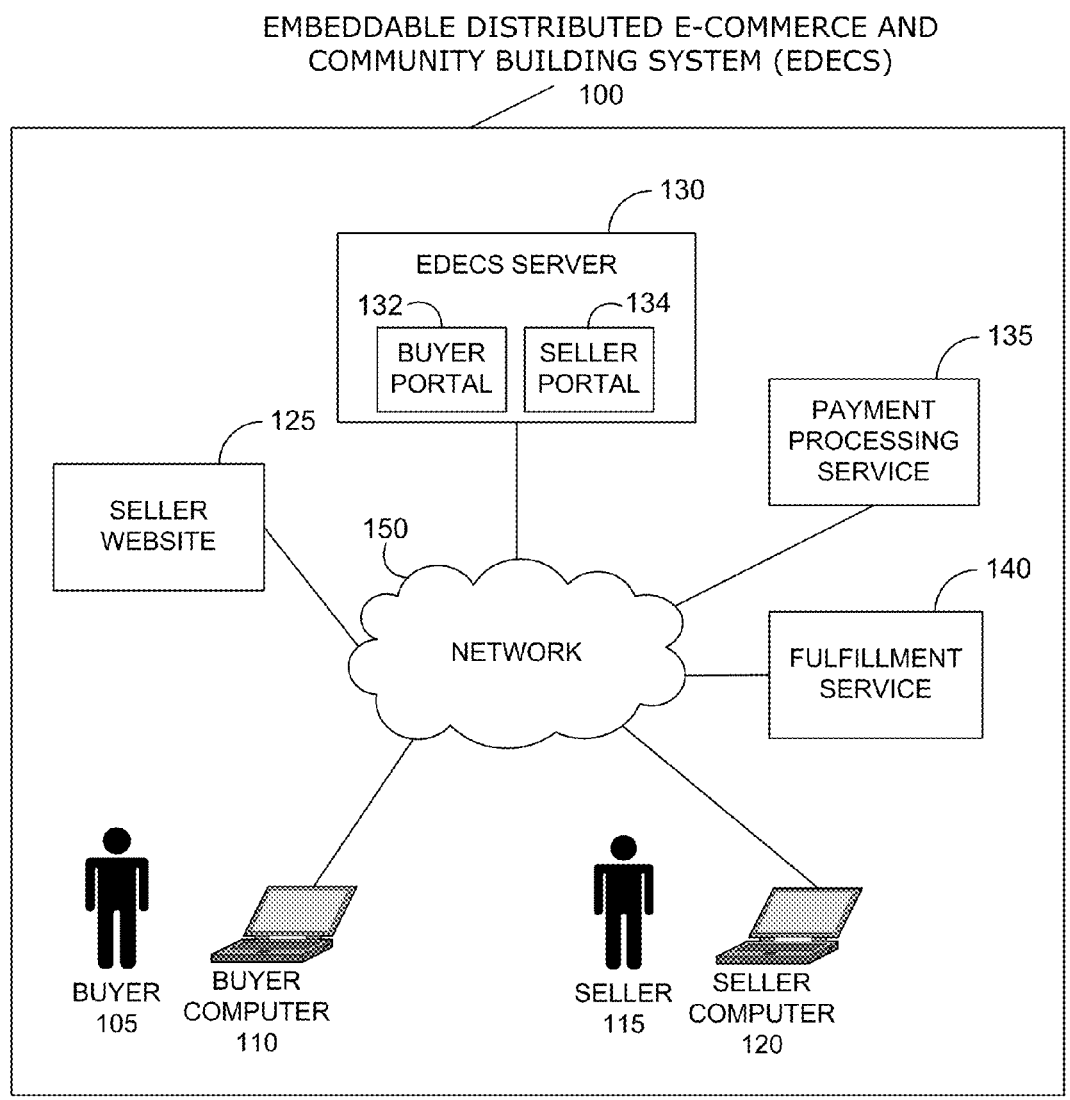
FIG. 1 is a simplified block diagram of an embeddable distributed e-commerce and community building system (EDECS) that enables a buyer using a buyer computer to purchase one or more creations from a seller website and/or seller blog, in accordance with an embodiment of the present invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods, or devices. Accordingly, the present invention may take the form of an entirely hardware embodiment or an embodiment combining software and hardware aspects. The following detailed description is, therefore, not to be taken in a limiting sense.

The present invention describes a system, referred to herein as an embeddable distributed e-commerce and community building system or simply "EDECS", which adds e-commerce and online community capabilities to an existing website or blog. EDECS enables a customer to purchase items directly from a seller's website or blog through a direct purchase, auctioned purchase, escrow purchase, or other e-commerce method. EDECS provides both an e-commerce user interface on an existing website or blog, and the back-office processes required to prepare the products requested and fulfill an order.

As used herein the following terms have the meaning given below:

Creation, media item, or item—A creation or item may refer to an item of media including inter alia a photo, digital image, video, digital video, animation, or music, or to a physical item such as a painting, craft, mechanical device, sculpture, or hand-made greeting card.

Seller—refers to a person that offers one or more creations from a seller website or a blog.

Buyer or visitor—refers to a person that uses a web browser running on a personal computer, mobile device, or other type of computer capable of running a web browser to visit a seller website or blog.

Web page—refers to an HTML web page that is viewed using a web browser. As used herein, the term web page may also refer to a blog page. Where a blog is a specialized type of web page, typically maintained by an individual whose entries are commonly displayed in reverse-chronological order. A web page may include client-side scripting code in addition to HTML as is discussed later.

Website—refers to a collection of static or dynamically generated web pages that are addressed with a common domain name in a network that uses Internet protocols. A web site is hosted on at least one web server which is a specialized type of server computer that serves web pages to a client computer running a web browser application. As used herein, the term website also refers to a blog site that provides blog pages to a web browser, including variations such as a photoblog, which enables the blog owner to easily embed and annotate images, or a videoblog, which enables the blog owner to easily embed and annotate videos.

Client-side script—refers to programming language instructions written in a client-side scripting language that are executed by a web browser. such as JAVASCRIPT from Sun Microsystems. A client-side script may be embedded in a web page. Alternatively, a web page may include an instruction that causes it to download a client-side script from a web server. A client-side script is interpreted by a client-side scripting engine that is embedded in or controlled by a web browser running in a client computer. A client-side scripting engine enables the web browser to perform functions not available through HTML commands such as advanced graphics, database access, and computations. Unless otherwise specified, the JAVASCRIPT client side-scripting language is used in this invention. JAVASCRIPT is a trademark of Sun Microsystems of Mountain View, Calif., and is supported by most commercial browsers. Other client-side scripting languages that can alternatively be used include the Java open source programming language, Flash from Adobe Systems Inc., and ActiveX from the Microsoft Corporation. For purposes of specificity, all of the client-side capabilities described herein can be accomplished using a web browser such as Mozilla Firefox, Microsoft Internet Explorer, and Apple Safari in conjunction with JAVASCRIPT version 1.5, or greater. A description of JAVASCRIPT version 1.5 may be found in the book JavaScript: The Definitive Guide, by David Flanagan, August 2006, published by O'Reilly Media, Inc., which is incorporated herein by reference.

Now reference is made to FIG. 1, which is a simplified block diagram of an embeddable distributed e-commerce and community building system (EDECS) that enables a buyer using a buyer computer to purchase one or more creations from a seller website, in accordance with an embodiment of the present invention. As depicted in FIG. 1, a buyer computer 110, a seller computer 120, a seller website 125, an EDECS server 130, a payment processing service 135, and a fulfillment service 140, are interconnected via a network 150. Typically, network 150 is the public Internet. However network 110 may also be a private network, a local area network or any other type of network that enables a plurality of computers and/or online services to exchange digital messages. Further seller website 125 and EDECS server 130 may each be implemented using either a single computer server or a plurality of computer servers working cooperatively.

A seller 115 offers photos and other information about his/her creations via seller website 125. As previously discussed, seller website 125 may be inter alia a website that offers conventional web pages or a blog that provides blog pages to a web browser running in buyer computer 110. Seller website 125 may include a server computer. Seller website 125 may host more than one website. Seller website 125 may be operated by seller 115 or by a web hosting provider, i.e. a company that hosts websites for sellers. The creations offered for sale on seller website 125 may include digital media items. In one embodiment, seller website 125 displays digital images in web pages that each digital image representing a digital media item offered for sale or licensing by seller 115. Seller 115 participates in EDECS 100 by adding a set of instructions, referred to as a "widget embedding script", to the web pages on seller website 125. When executed by the web browser running in buyer computer 110, the widget embedding script causes a client side application to be downloaded to the web browser. The client-side script, when executed by the web browser running in buyer computer 110 communicates with EDECS server 130 to provide e-commerce services.

A buyer 105 uses buyer computer 110 to search for or browse, select and purchase creations available from seller website 125. Buyer computer 110 is any PC, laptop, mobile device or other device that runs a web browser that enables a buyer to visit seller website 125 and to open, view and interact with web pages provided by seller website 125.

EDECS server 130 provides e-commerce services that enable buyer 105 to purchase one or more creations from seller website 125. EDECS server 130 generates an electronic order for each purchase made by buyer 105. EDECS server 130 uses payment processing service 135 to obtain payment from buyer 105 and fulfillment service 140 to fulfill an order.

EDECS server provides a buyer portal 132 to buyer 105 that provides information about his/her orders and a seller portal 134 to seller 115 that enables seller 115 to configure e-commerce for his/her creations and to obtain sales information for his/her creations. Buyer portal 132 is discussed in further detail with reference to FIGS. 4A-C and FIG. 6. Seller portal 134 is discussed in further detail with reference to FIGS. 5A-B and FIG. 6.

EDECS server 130 interacts with a number of payment processing services 135, including credit card payment processing services and online payment services, such as PayPal, Google Checkout, or Amazon Flexible Payments. Credit card payments are provided by a payment processing service 135 that provides merchant accounts for credit card processing such as Authorize.net. The Authorize.net service is provided by the CyberSource Corp. of Mountain View, Calif.

Fulfillment service 140 refers to any external service used by EDECS server 130 to fulfill an order. For example, in the case of an order for prints of a digital image EDECS server will transfer the digital image to the appropriate fulfillment service 140 along with a work order that includes details specifying the service or work to be performed by fulfillment service 140 such as the product to be fabricated, the quantity, the type of paper, the print size or mug size, in the case of a printed mug, and the like.

Typically fulfillment service 140 is provided by a third party, i.e. a different company than the company that operates EDECS 100. However, fulfillment service 140 may be provided by the company that operates EDECS 100.

Depending on the type of product, fulfillment service 140 may perform processing such as transcoding of video and/or audio files into different formats or production of output files of various quality levels. For each type of product, such as prints and postcards for photos, or transcoding into different video formats, EDECS 100 may send work orders to more than one fulfillment service 140 to fulfill an order.

Alternatively, an order may be fulfilled directly by seller 115.

EDECS 100 may have various embodiments based on the type of products sold by seller 115. Two such embodiments are described below with reference to FIGS. 2A-C and 3. These embodiments should by no means restrict the application of the invention to other embodiments which may include any physical or digital product or service that is promoted on a website or blog.

Embodiment 1

Selling Products Derived from Digital Media Items

In one embodiment of the invention, a website used to promote digital media items created by one or more artists is enhanced to enable buyers to purchase products derived from the digital media items or to license the digital media. The digital media promoted includes any art form that can be represented digitally on a web or blog site including inter alia images or photographs, videos, music, animation, text such as poems, speeches or other writings, and animations. In the example described with reference to FIGS. 2A-2C, a photographer, acting in this example as seller 115, uses EDECS 100 to enable visitors to seller website 125, which displays his/her photographs, to buy products and merchandise that incorporate his/her photos. By using EDECS 100, seller 115 incorporates a complete e-commerce system into his/her web or blog site and thus eliminates the need for a third party e-commerce hosting service.

This embodiment of EDECS 100 also allows seller 115 to license to buyer 105 certain rights to digital media. In this case, buyer 105, who is in this case, a licensee, to visit seller website 125 and to license digital media items directly from seller website 125. What the buyer purchases is a license to use all or part of a digital media item. Rights licensed may include inter alia (1) the right to use the digital media item for specified period of time, (2) the right to use the digital media item in a specified geographic area, (3) the right to use the digital media item for a specific purpose for example for print ads or web ads.

Figure 2A:
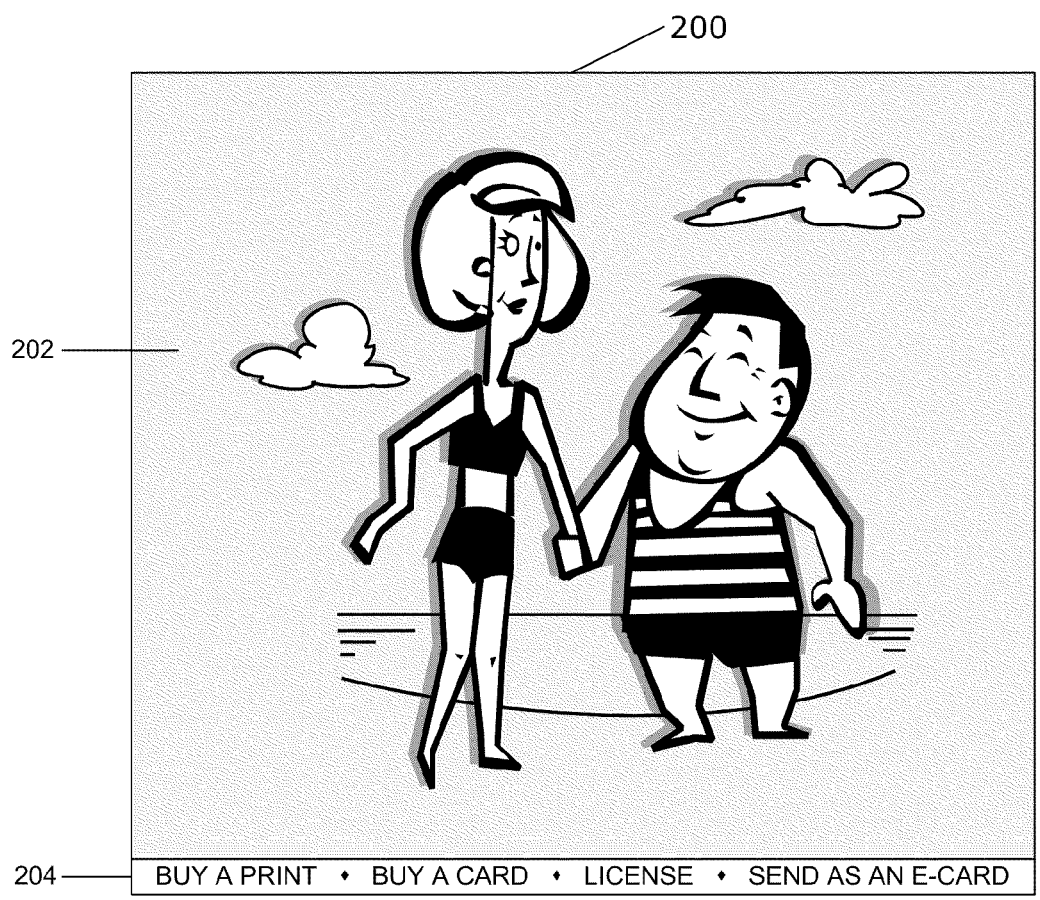
FIG. 2A is an example of a digital image in a web page with a buy and share toolbar that enables a buyer to purchase printed products based on the digital image and to send a copy of the digital image as an e-card, in accordance with an embodiment of the present invention.

Now reference is made to FIG. 2A, which is an example of a digital image in a web page with a buy and share toolbar that enables a buyer to purchase printed products based on the digital image and to send a copy of the digital image as an e-card, in accordance with an embodiment of the present invention. The web page depicted in user interface 200 displays a buy and share toolbar 204 beneath a representation of a digital image 202. Buy and share toolbar 204 is customized to sell products based on digital media and to license and share digital media. In this example, buy and share toolbar 204 offers four controls: buy a print, buy a card, license the image and send as an e-card.

If buyer 105 selects the buy a print control on buy and share toolbar 204, then a user interface 210, described with reference to FIG. 2B, appears. If buyer 105 selects the buy a card control then a user interface 230, described with reference to FIG. 2C, appears. If buyer 105 selects a control to license the image then a user interface, not depicted, appears. If buyer 105 selects a control to send an e-card then a user interface, not depicted, appears. Additional products can be added with only slight modification to buy and share toolbar 204. It may be appreciated by one skilled in the art that with this approach new products may be flexibly added. Specifically, when a new product is added, a new control is added to buy and share toolbar 204 that enables buyer 105 to initiate the purchase of the new product and a corresponding user interface is provided by EDECS server 130 when buyer 105 selects the new control.

Figure 2B:
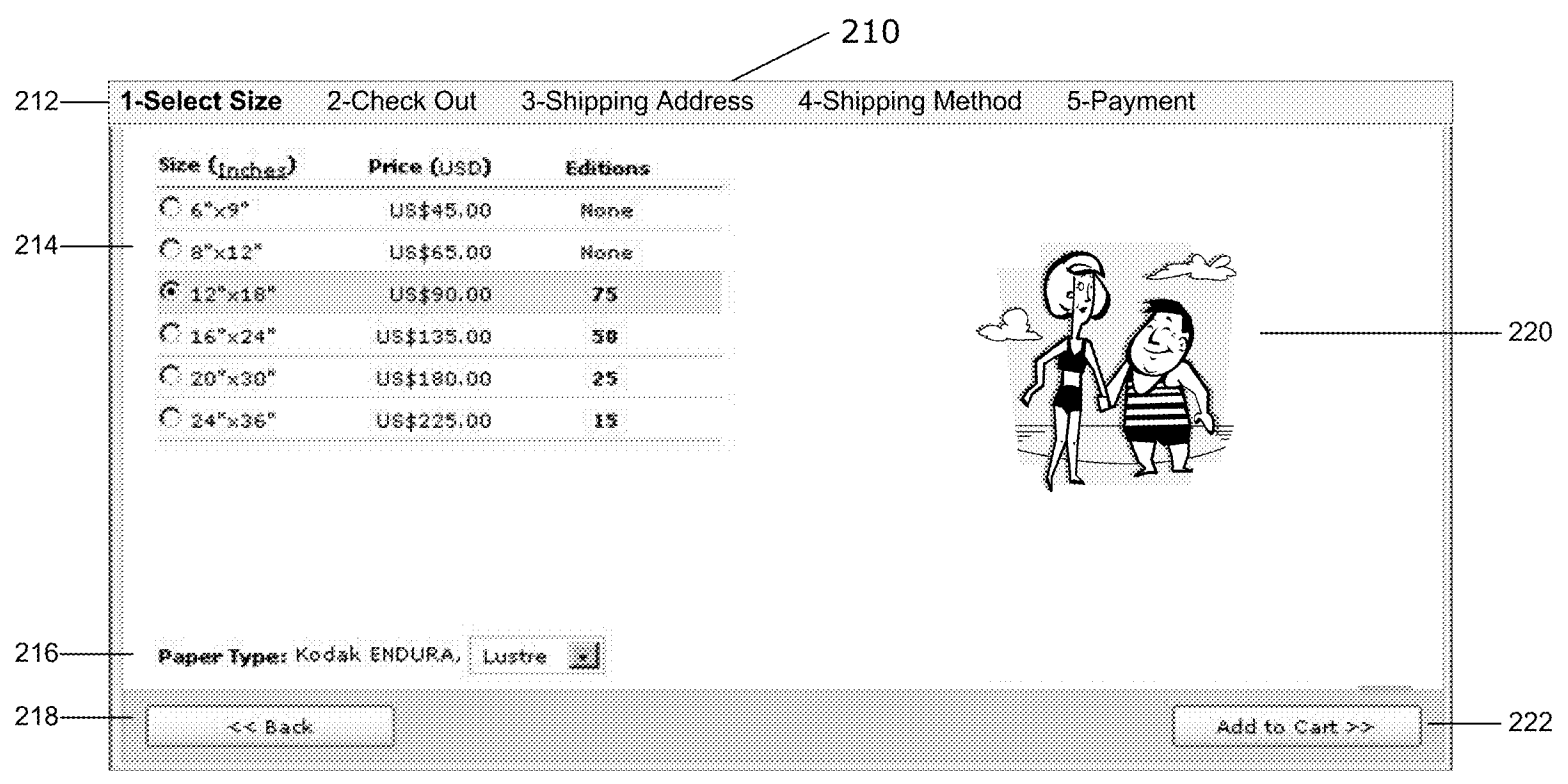

Now reference is made to FIG. 2B, which is an example of a user interface that enables a buyer to specify various options of a print order, in accordance with an embodiment of the present invention. User interface 210 is provided by EDECS server 130 when buyer 105 selects the buy a print control from buy and share toolbar 204, as described with reference to FIG. 2A. A processing step control 212 indicates the current step being performed in the five step ordering process. In this example, the five steps are (1) select a size for the print, (2) check out, (3) provide a shipping address, (4) select a shipping method, and (5) make an electronic payment. Steps 2-5 are neither illustrated nor described herein as they are similar to comparable steps performed on existing e-commerce websites. What is unique about the EDECS 100 approach is that the steps are performed without buyer 105 having to leave seller website 125.

A size control 214 enables buyer 105 to selects a size for the printed image from a list of print sizes. A small version 220 of the image to be printed is displayed. A paper type control 216 enables buyer 105 to select a paper type. Two controls, a back control 218 and an add to cart control 222 allow the user to move backwards and forwards through the five steps in the process.

Figure 2C:
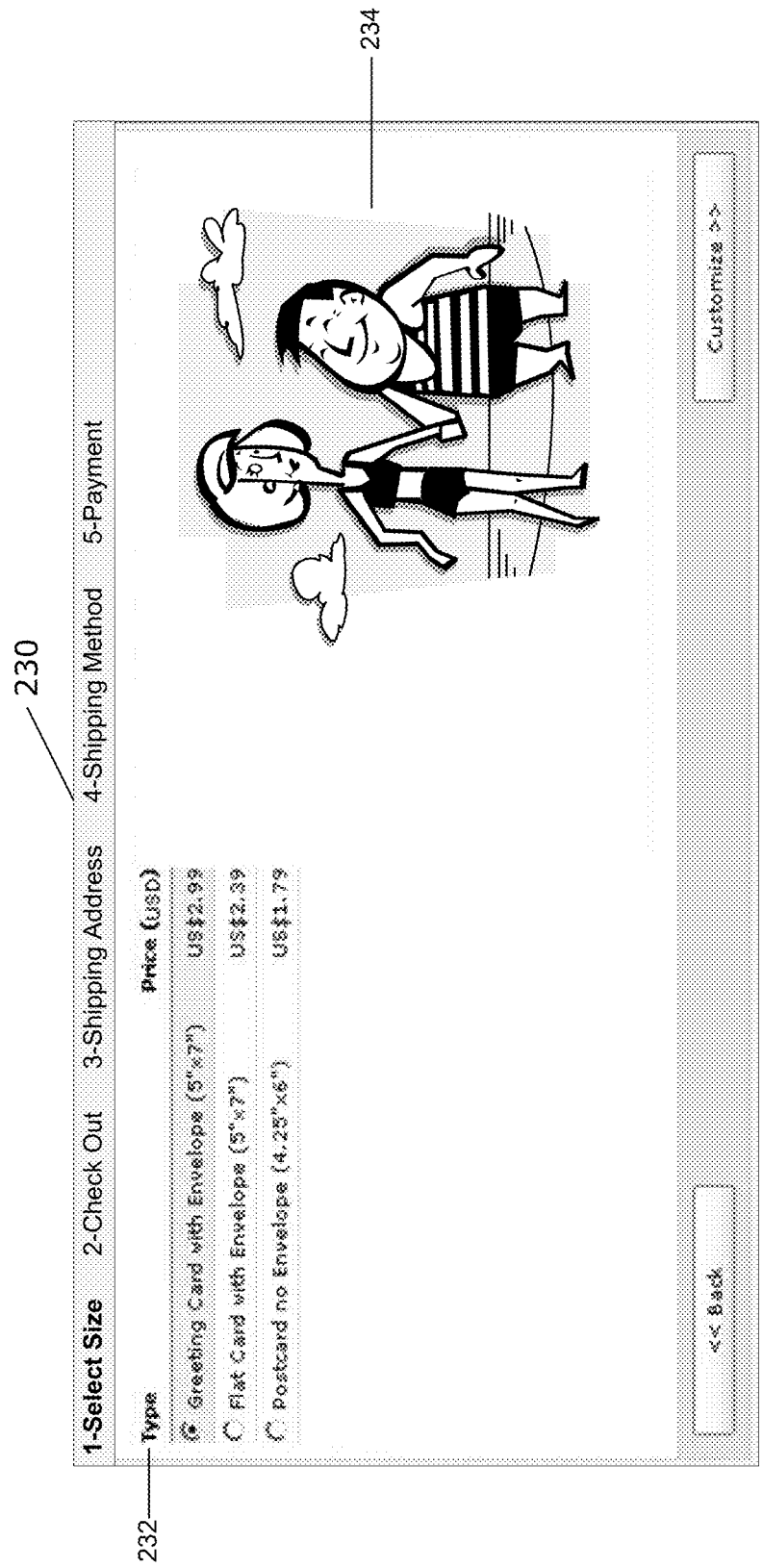
FIG. 2C is an example user interface, in accordance with an embodiment of the present invention.

Now reference is made to FIG. 2C, which is an example of a user interface that enables a buyer to specify options for a printed card, in accordance with an embodiment of the present invention. User interface 230 is provided by EDECS server 130 when buyer 105 selects the buy a card control from buy and share toolbar 204, described with reference to FIG. 2A. Buyer 105 selects a type of card size a list of types of card 232. A preview of the card 234 is displayed.

Embodiment 2

Selling Products

In a second embodiment of the invention, a website used to promote creations created by one or more artists is enhanced to enable buyers to purchase the products depicted in images that appear on the website. The products promoted include any physical product or service that can be represented using digital media such as, digital images, digital videos, or text, on a web or blog site including inter alia items of art and craft, books, records, automobiles, games, and tools. In the example web page described with reference to FIG. 3, a jeweler, acting in this example as seller 115, uses EDECS 100 to sell jewelry directly from his/her website, seller website 125. By using EDECS 100, seller 115 incorporates a complete e-commerce system into his/her website and thus eliminates any need for a third party e-commerce hosting service.

When seller 115 uses the invention in conjunction with seller website 125, visitors to seller website 125 may (1) select products depicted on website 125 for purchase, specify sizes and other product options, add the products to a shopping cart, (2) see the total price, shipping options and shipping costs, and (3) make electronic payments. Upon successfully placing an order, EDECS 100 electronically notifies seller 115 of the order. Typically, notification is performed by email and the email message includes information about the product and buyer.

Figure 6:
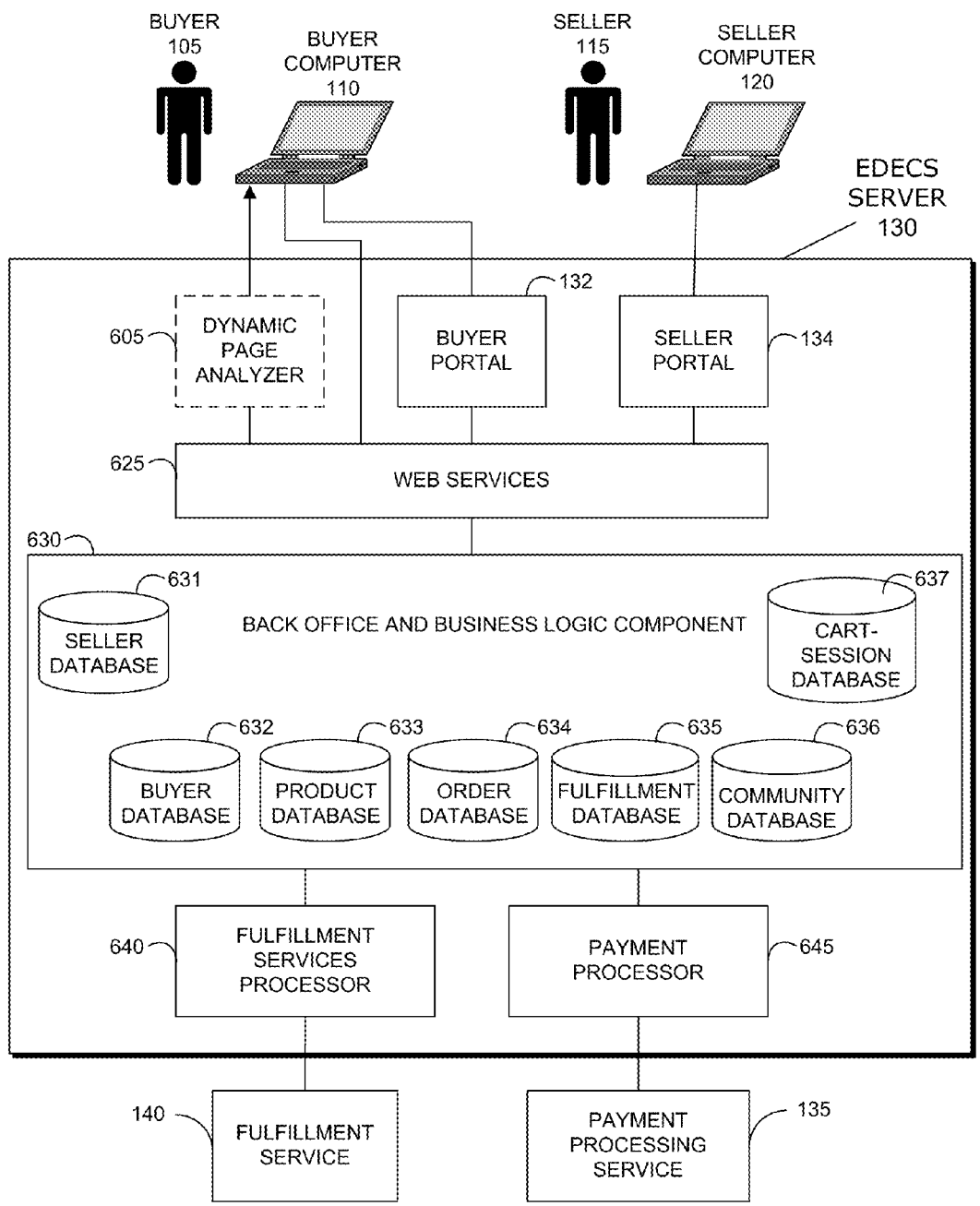
FIG. 6 is a high level block diagram of the software components of an embeddable distributed e-commerce and community building system (EDECS) server, in accordance with an embodiment of the present invention.

The method performed by buyer 105 when using EDECS 100 to purchase products derived from digital media, is similar to the method used in the current embodiment, purchasing ordinary products. However, the method for fulfilling the purchase, discussed in detail below with reference to FIG. 6, is different.

Figure 3:
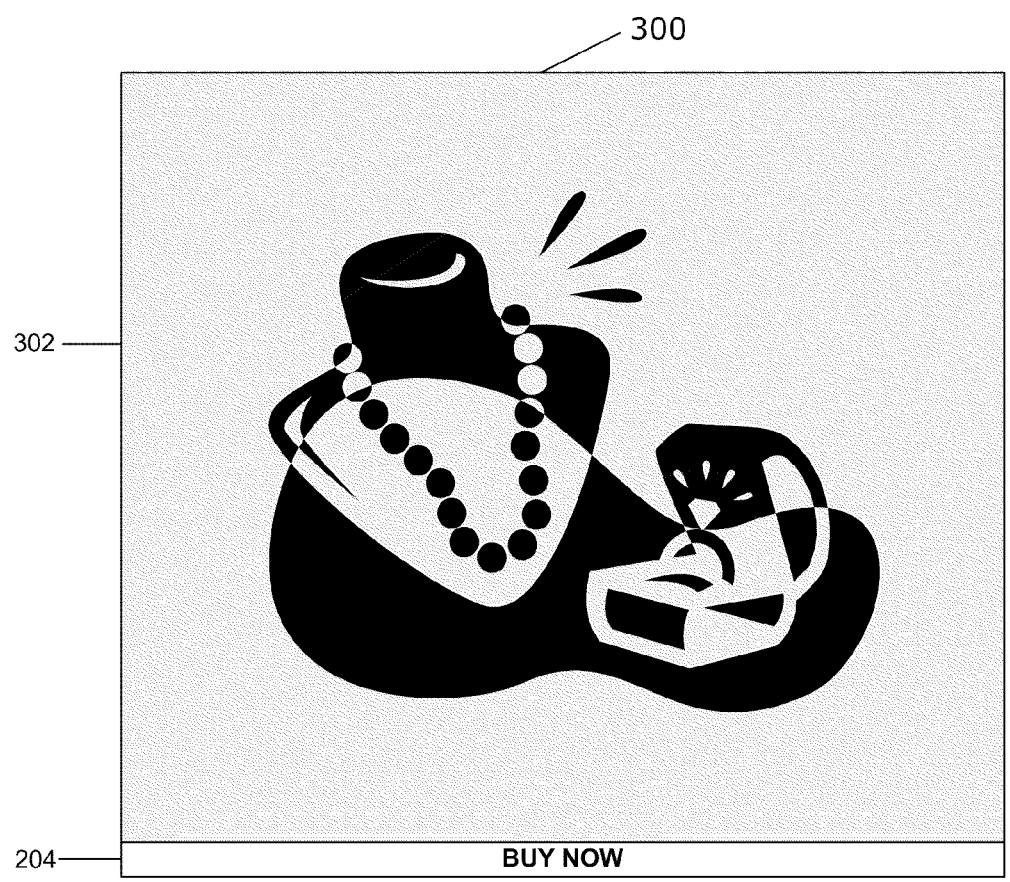
FIG. 3 is an example of an image of a product in a web page with a buy and share toolbar that enables a buyer to purchase the pictured product, in accordance with an embodiment of the present invention.

Now reference is made to FIG. 3, which is an example of an image of a product in a web page with a buy and share toolbar that enables a buyer to purchase the pictured product, in accordance with an embodiment of the present invention. The web page depicted in user interface 300 displays buy and share toolbar 204 beneath a digital image 302. In this example, buy and share toolbar 204 offers a single buy now control.

If buyer 105 selects the buy now control, using buy and share toolbar 204, then a user interface, not depicted, is provided by EDECS server 130 that enables the user to specify any product characteristics such as sizes, colors and prices. Such characteristics are configured by seller 115 using seller portal 132, described with reference to FIGS. 4A-4C.

Figure 4A:
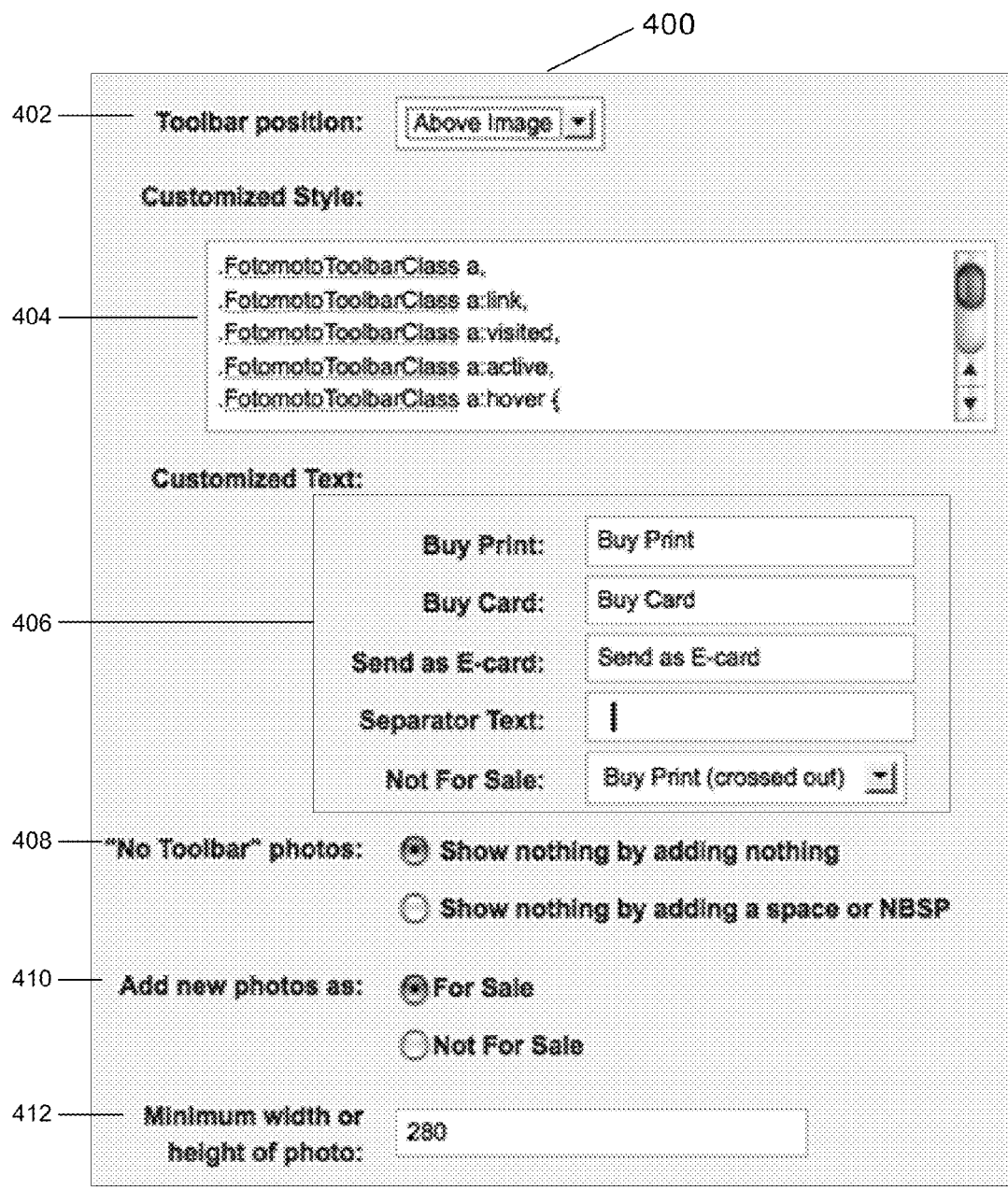
FIG. 4A is an example user interface for a seller portal that enables a seller to customize a buy and share toolbar, in accordance with an embodiment of the present invention.

Now reference is made to FIG. 4A, which is an example user interface 400 for a seller portal that enables a seller to customize a buy and share toolbar, in accordance with an embodiment of the present invention. Buy and share toolbar 204 enables seller 115 to specify for each image that appears on a web page provided by seller website 125 whether the e-commerce is to be provided for either (1) the digital media item depicted in the image (as per embodiment 1) or (2) the product depicted in the image (as per embodiment 2). If e-commerce is to be provided then seller 115 uses user interface 400, provided by seller portal 134, to configure buy and share toolbar 204, which is be displayed next to the image.

A toolbar position control 402 enables seller 115 to select between different possible locations for buy and share toolbar 204 relative to the image. In one embodiment the alternative positions are above the image and below the image.

A customize style entry box 404 enables seller 115 to add HTML cascading style sheet (CSS) code that will control the visual characteristics, including color and fonts, of buy and share toolbar 204.

A group of customized text controls 406 enables seller 115 to change the text displays on buy and share toolbar 204 for each control and for the separator character that appears between controls. Group of customized text controls 406 includes a control that enables seller 115 to specify how to display a control that corresponds to a product, e.g. a print, that is not for sale.

A no toolbar control 408 enables seller 115 to specify what visual element if any should be displayed in the event that no buy and share toolbar 204 is shown next to an image.

An add new photos control 410 enables seller 115 to specify the default setting when new photos are added. In the embodiment depicted in user interface 400, the possible default settings are for sale and not for sale.

A minimum size control 412 enables seller 115 to specify that images with a width or height less than a certain size do not meet a minimum size requirement and no buy and share toolbar 204 should be displayed.

In addition to minimum size control 412, seller portal 134 provides several other configuration parameters, not depicted that enable seller 115 to prevent adding buy and share toolbar 204 next to an image in certain cases. These configuration parameters include inter alia: (1) specifying a URL pattern, and (2) specifying that images that reside in a designated folder should not receive buy and share toolbar 204.

Figure 4B:
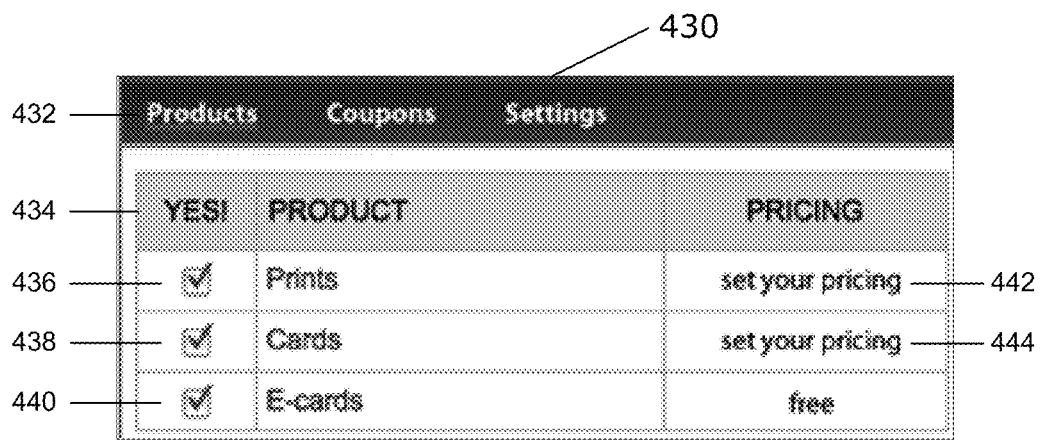
FIG. 4B is an example user interface for a seller portal that enables a seller to select the products to be sold, in accordance with an embodiment of the present invention.

Now reference is made to FIG. 4B, which is an example user interface 430 for a seller portal that enables a seller to select the products to be sold, in accordance with an embodiment of the present invention. Seller portal 134 provides user interface 430 to seller 115 to enable him/her to select products to be sold using buy and share toolbar 204 and to establish pricing for the selected products. A product table 434 lists each control that can be added to buy and share toolbar 204. A print control 436 enables seller 115 to specify whether a print control should be added to buy and share toolbar 204. Similarly, a card control 438 enables seller 115 to specify whether a card control should be added to buy and share toolbar 204. Finally, an e-cards control 440 enables seller 115 to specify whether an e-card control should be added to buy and share toolbar 204. Seller 115 uses a set print pricing control 442 to specify pricing for prints and a set card pricing control 444 to specify pricing for cards. For each control in product table 434 that is selected, a visual control will appear on buy and share toolbar 204. For example, if seller 115 uses print control 436 to specify that he/she wants to offer prints, then a visible print control will be displayed on buy and share toolbar 204. An example of a user interface that enables seller 115 to specify pricing for prints is described below with reference to FIG. 4C.

Now reference is made to FIG. 4C, which is an example user interface 450 for a seller portal that enables a seller to specify the price for a product, in accordance with an embodiment of the present invention. User interface 450 displays a table of print sizes and prices 452 that includes a row for each differently priced set of print sizes. Each row includes a control, a "+" sign in user interface 450, that enables seller 115 to expand the row to show additional sizes. For each print size seller 115 wishes to offer, he/she selects the offered checkbox for the row and selects one size in the row.

Now reference is made to FIG. 5A, which is an example user interface 500 for a buyer portal that enables a buyer to view a list of orders he/she has placed, in accordance with an embodiment of the present invention. User interface 500, provided by buyer portal 132, displays a list of orders that seller 115 has previously placed at seller websites that participate in EDECS 100. Each row 502 in the list of orders includes the following information: a thumbnail that depicts the digital media item or product purchased, the date the order was made, a unique order number, the seller name and email address, the store, i.e. seller, at which buyer 105 purchased the item, the total price paid and the method of payment used and the current status of the order. Also, each row includes a details control 504. When buyer 105 selects details control 504, buyer portal 132 provides to the web browser running in buyer computer 110 additional details about the corresponding order which are displayed to buyer 105. The additional details include the name of buyer 105 and the shipping address for the order, information about seller 115 including their name and website address, the price of the order, shipping details and a description of any product options selected.

Figure 5B:
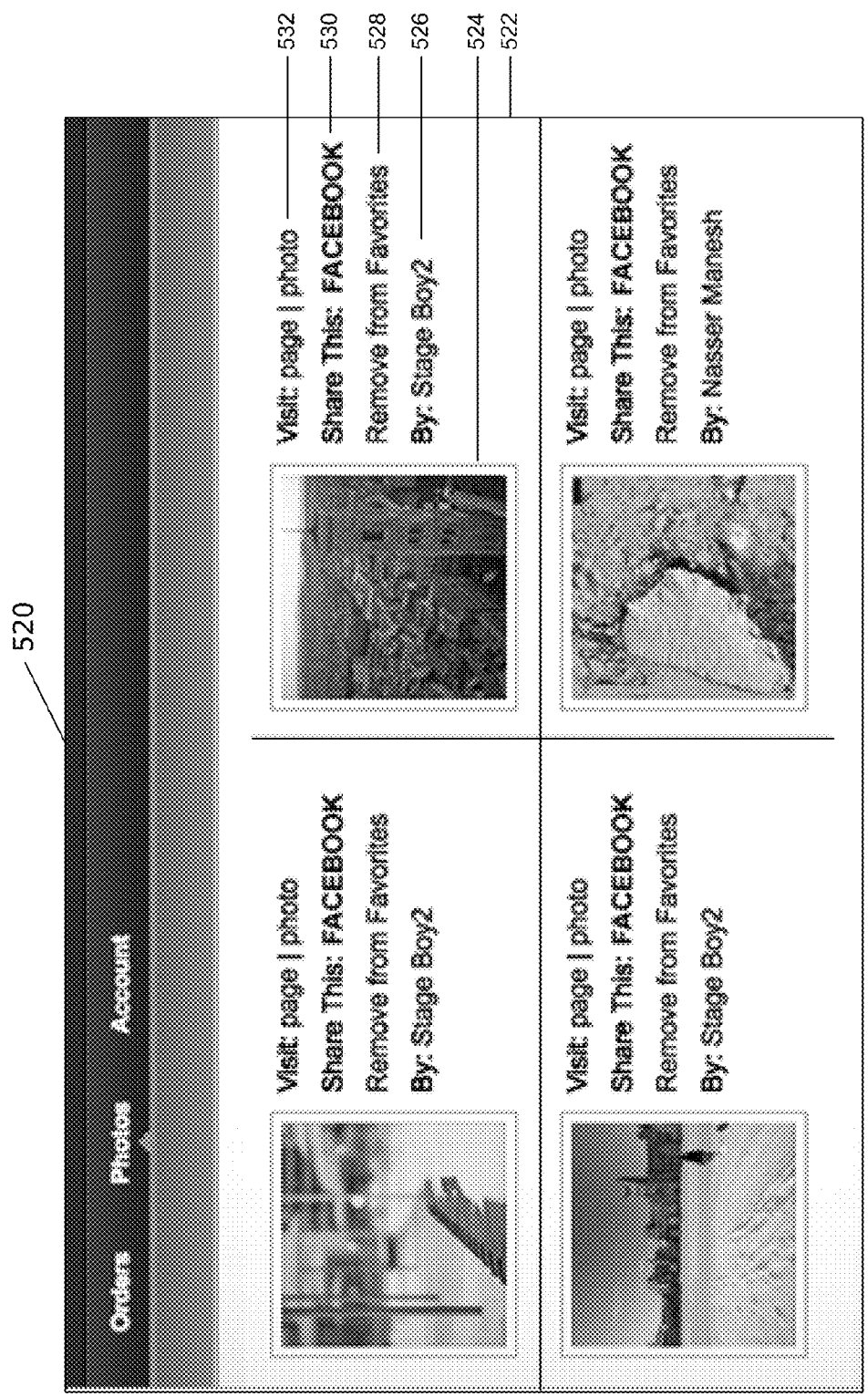
FIG. 5B is an example user interface for a favorite photos web page in a buyer portal that enables a buyer visit, share and remove favorite photos, in accordance with an embodiment of the present invention.

Now reference is made to FIG. 5B, which is an example user interface 520 for a favorite photos web page in a buyer portal that enables a buyer visit, share and remove favorite photos, in accordance with an embodiment of the present invention. Buyer portal 132 enables buyer 105 to view all photos that buyer 105 selected as a favorite photo when browsing web pages provided by seller website 125. User interface 520 includes a favorite photo panel 522 for each favorite photo selected by buyer 105. Favorite photo panel 522 includes an image thumbnail 524 of a favorite image, the name of the photographer 526 that took the photo. In addition, favorite photo panel 522 includes three controls: a remove from favorites control 528, a share this control 530, and a visit control 532. When buyer 105 selects remove from favorites control 528 the photo is deleted as a favorite photo. Buyer 105 uses share this control 530 to insert a link to the photo on a social network website. In the example presented in FIG. 5B, the FACEBOOK social network is shown. In this case, the FACEBOOK API would be used to add a link to the photo in the FACEBOOK account of buyer 105. FACEBOOK is a social network website that enables independent application developers to use a published API to use FACEBOOK services such as posting a link. FACEBOOK is provided by FACEBOOK Inc. of Palo Alto, Calif. Buyer 105 uses visit control 532 to specify whether the photo or the web page containing the photo should be displayed when buyer 105 clicks on image thumbnail 524.

Now reference is made to FIG. 6, which is a high level block diagram of the software components of an embeddable distributed e-commerce and community building system (EDECS) server 130, in accordance with an embodiment of the present invention. EDECS server 130 uses a web services 625 to communicate with buyer computer 110, seller computer 120, payment processing service 135 and fulfillment service 140. In general, to use the services provided by EDECS server 130, the web browser running inside buyer computer 110 or seller computer 120 issues a request for service message using the hypertext transfer protocol (HTTP) to web services 625. Web services 625 receives the HTTP request and invokes the appropriate server software module in EDECS server 130 to process the request. Web services 625 may include a commercially available application server that includes a web server that accepts and processes HTTP requests from the web browser and serves or transmits HTTP responses back to the web browser along with optional data contents, which usually are web pages in HTML format and linked objects (images, or the like). Henceforth, the term request message refers to a message sent by a web browser using HTTP or another client-server communications method to web services 625. A response message refers to a message sent in response, typically using the same communications method, by web services 625 to the web browser.

As previously mentioned, to use EDECS 100 to provide e-commerce services for a creation, seller 115 adds a widget embedding script to a web page on seller website 125 that displays the creation. When the web browser running in buyer computer 110 executes the widget embedding script it issues an HTTP request to EDECS server 130 to provide a dynamic page analyzer 605. In response, EDECS server 130 sends an HTTP response message that includes dynamic page analyzer 605. Dynamic page analyzer 605 is a client-side script, that is then executed by the web browser. So, while dynamic page analyzer 605 resides on EDECS server 130, it is sent to and executed by the web browser running on buyer computer 110. Seller portal 134 provides the widget embedding script to seller 115 when he he/she registers with EDECS 100.

Dynamic page analyzer 605 analyzes a web page and determines where on the web page to add an instance of buy and share toolbar 204. Multiple instances of buy and share toolbar 204 may be added to a single web page. Dynamic page analyzer 605 generates the web page code, including HTML and any client-side scripting code required, to display each buy and share toolbar 204 that it adds to a web page. Both the widget embedding script and dynamic page analyzer 605 are further discussed with reference to FIG. 7.

As previously discussed, buy and share toolbar 204 provides controls that enable buyer 105 to purchase, license, share or obtain a printed version of the creation being viewed. When buyer 105 selects a control from buy and share toolbar 204, buyer computer 110 creates and sends an HTTP message to EDECS server 130 requesting a dynamic cart. EDECS server 130 in response sends a HTTP response message that includes a dynamic cart, which is client-side script that when executed by a web browser creates an interactive shopping cart appropriate to the product selected for purchase within the currently displayed web page.

The dynamic cart client-side script, when executed by the web browser running in buyer computer 110, first adds an HTML DIV element to the DOM of the current web page causes a window to display on the screen. The dynamic cart uses the parameters supplied as a result of buyer 105 selecting a control from buy and share toolbar 204, to fetch from EDECS server 130 the client-side script and HTML content required to provide the specific dynamic cart features appropriate to the product selected by buyer 105. The dynamic cart provides the visual and interactive elements that enable buyer 105 to specify product options, place orders, and make payments while staying within the same web page on seller website 125.

The dynamic cart communicates with a back office and business logic component 630 which performs order processing, payment processing via a payment processor 645, bidding and auction processing, escrow processing, and fulfillment via a fulfillment services processor 640. Back office and business logic component 630 also stores and maintains a number of databases including a seller database 631, a buyer database 632, a product database 633, an order database 634, a fulfillment database 435, a community database 436, and a cart session database 637.

Seller database 631 stores information about the sellers whose creations are sold via seller website 125. The information includes: a unique seller ID, the URL of seller website 125, a site key which is a unique string generated by EDECS server 130 to identify the seller website 125, any customization seller 115 makes to his/her dynamic page analyzer script using seller portal 134, the seller's preferred method of receiving their sales proceeds such as mailing checks, direct bank transfer, or PayPal, as well as information required to perform the method such as mailing address for checks, bank account number for direct transfer, or PayPal account for PayPal transfer.

Buyer database 632 stores information about each buyer 105 that visits a seller website, including a unique buyer identifier (ID), a shipping address, and a preferred payment method.

Product database 633 stores information about each product sold on seller website 125. This includes a unique product ID, available options, and prices set by seller 115 using seller portal 134.

Order database 634 stores information about each order processed by EDECS 100. Every record in this database represents an order, i.e. an instance of a buyer "checking out" items from an electronic shopping cart. The order includes a unique order ID and information about the order including the date and time the order was made, current fulfillment status, payment status, and a list of product IDs that include one product ID for each product in the order.

Fulfillment database 635 stores information about different fulfillment services that EDECS server 130 may use to fulfill an order. Each record describes a fulfillment services and includes a unique fulfillment service id, information describing how to electronically interact with the fulfillment service to use services provided by the fulfillment service, and type of products that the fulfillment service can fulfill, i.e. fabricate, package and ship. Upon receiving an order EDECS server 130 looks up the products buyer 105 purchased in product database 633, matches that against the types of products represented in fulfillment database 635, and determines which fulfillment service(s) to submit a work order to.

Community database 636 stores buyer behavior information including inter alia the level of interest buyers show in items by purchasing them, making them favorite, rating them, etc.

Any seller website 125 that adds the widget embedding script participates in EDECS 100. Buyer 105 may visit any website participating in EDECS 100 and add an item to their shopping cart. Therefore, if buyer 105 moves from one website participating in EDECS 100 to another website participating in EDECS 100 he/she can use the same sign-in information, access the same dynamic cart, and add items or otherwise make changes to the same dynamic cart. Thus, it is possible for buyer 105 to select items from different, independent, websites, each participating in EDECS 100, and to check out pay for all items in the dynamic cart only once. In order to do this, back office and business logic component 630 stores a "cart session" object for buyer 105 in cart session database 637. Each cart session object includes two sub-objects: a session object, which includes information about the type of browser on buyer computer 110 identifies the buyer 105, and a cart-item object that identifies each item in the dynamic cart. Each cart-item object includes a unique product id, a specification of any product options, such as such as size and paper type, the URL of the seller website 125 the item appears on, and its price. As buyer 105 moves from one web page to the other and adds items to his/her dynamic cart, the dynamic cart makes HTTP requests to EDECS server 130 to add the item to the cart session for buyer 105. Similarly, if buyer 105 removes an item or changes the selected options of an item using the dynamic cart, the dynamic cart sends an HTTP request to EDECS server 130 to modify the cart-session object stored in cart session database 637.

Back office and business logic component 630 receives, analyzes and processes orders received by web services 625 from the web browser running in buyer computer 110. Back office and business logic component 630 analyzes an order to determine which fulfillment service(s) 140 should handle the order. It then uses fulfillment services processor 640 to send work orders to each fulfillment service 140.

The fulfillment service required to fulfill an order depends on the type of product ordered. For example, seller 115 may specify that a digital photo being sold on seller website 125 can be purchased in a variety of formats, including inter alia various sizes of prints, a framed printed image, an image printed on a mug or t-shirt or greeting card. Each such format, size, or packaging of a creation is represented as a separate stock keeping unit (SKU) and each SKU may be fulfilled by a different fulfillment service 140.

One EDECS order, stored in order database 634, may result in a plurality of work orders submitted to one or more fulfillment services 140. For example, a single order placed by buyer 105 may include multiple products such as (1) a poster print of a photo from an artist's blog, (2) a framed print of a digital image, (3) a t-shirt with a printed version of the image, and (4) a mug also including a printed version of the same image. EDECS server 130 uses information from fulfillment database 635 to determine which fulfillment service can make a poster print, which can print on a t-shirt, and which can print on a mug. EDECS server 130 will also check to see which fulfillment service 140 provides the type of frame that buyer 105 requested. Once each fulfillment service 140 is identified, EDECS server 130 obtains from fulfillment database 635 the information necessary to interact with each fulfillment service 140 and submits a work order to each of them. In this example, a single EDECS order results in up to four separate work orders placed with four different fulfillment services 140.

As previously discussed, the company that operates EDECS 100 may provide certain fulfillment services. Other fulfillment services may be provided by independent (third party) companies.

Back office and business logic component 630 tracks each work order to completion. For example, if buyer 105 orders a framed print of a digital image, back office and business logic component 630 first uses fulfillment services processor 640 to send the digital image file to an appropriate fulfillment service 140, and then directs that the printed image be shipped to a framer and provides the necessary description of the frame and shipping address. Some of the steps or work orders may be done manually while others may be done in a fully automated fashion via web services call between online services. However buyer 105 is not exposed to any of these manual or automated steps; he/she only sees a completed product.

When a product included in an order is derived from a media item such as a photograph, a video or sound, back office and business logic component 630 will typically send a request to seller 115 to provide a digital version of the media item. The digital media item is then included in the work order sent to fulfillment service 140. Alternatively, seller 115 may maintain online a repository of digital media elements and enable back office and business logic component 630 to fetch the digital media item when it is needed to fulfill an order.

The architecture of EDECS server 130 is independent of the physical storage technology. Thus, EDECS server 130 can work with a variety of physical storage and database management technologies including inter alia network access storage (NAS), Storage Attached Network (SAN), central server, replicated servers, and distributed servers.

Fulfillment services processor 640 communicates with each third-party fulfillment service 140 as necessary to fulfill an order. In general, each fulfillment service 140 specifies a communications interface that must be supported by fulfillment services processor 640. Fulfillment services processor 640 thus supports several communications interface methods, referred to as APIs, including a web service using HTTP, file transfer using FTP, and email. The content of a communication between fulfillment services processor 640 and fulfillment service 140 typically has two parts: the digital media content item to be used to make the ordered product, e.g. a digital photo, digital video or music clip, and or video, or music, and specification of the product to be made, including the product id and any options. The product specification is typically in an XML format or in the form of key/value pairs. It includes product option information such as size, paper type, shipping method, shipping address and shipping information.

As previously mentioned, the method performed by buyer 105 when using EDECS 100 to purchase products derived from digital media (first embodiment of the subject invention) is the same when using EDECS 100 to purchase ordinary products (second embodiment of the subject invention). However, the method for fulfilling a purchase is different. In the first embodiment fulfillment service 140 is required to complete and fulfill the order. EDECS 100 looks up the product by buyer 105, e.g. a print, postcard, or license, in fulfillment database 635 to determine which fulfillment service 140 to use to fulfill the order. Fulfillment services processor 640 uses the API of fulfillment service 140, to send a work order to fulfillment service 140 along with the digital media and control information required to process the work order. For example, if buyer 105 selects a canvas print, EDECS 100 selects a fulfillment service 140 that is capable of printing on canvas and sends an XML file containing the order information including, size, options, and shipping address information, along with the digital photo that is to be printed. Fulfillment service 140 then performs all aspects of the fulfillment process, including printing the photo on the right media and shipping it to buyer 105.

In the second embodiment, the product is fulfilled directly by seller 115. In this case, fulfillment processor 640 sends a work order by email to the seller including the product ID, shipping address and shipping method. Seller 115 is responsible for packaging and shipping the product.

Payment processor 645 interfaces with a number of payment services including credit card processing services and online payment services such as PayPal. Online payment services hide the credit card or financial details supplied by buyer 105. Each such online payment service provides a communications method, referred to as an application programming interface (API), that is used to send the required method of payment information including the order amount, tax amount, shipping amount, and list of purchased items. In this approach, the web browser used by buyer 105 is redirected to a web page on a website provided by the online payment service. Buyer 105 logs into his/her account with the online payment service and is presented with a bill that shows the items, order amount, tax amount, shipping amount, and finally a total. Buyer 105 interacts with the online payment service to make the payment and then the web browser is redirected back to seller website 125. With this approach, EDECS server 130 does not store any method of payment information from buyer 105. Payment processor 635 encapsulates the information described above into an XML formatted request message based on the API specification of the online payment service, and submits it to the online payment service via a web service call. The online payment service sends the result and status of the payment back to payment processor 635 via an XML formatted response message.

EDECS server 130 uses web services 625 to provide seller portal 134. Seller portal 134 enables seller 115 using seller computer 120 to access data from the databases stored by back office and business logic component 630. Seller portal 134 enables seller 115 to register with EDECS 100, customize his/her settings, view outstanding orders and obtain a widget embedding script. Seller 115 can obtain various lists by logging into the seller portal 134, including a list of buyers that have purchased seller 115 products, a list of buyers that have shown interest in seller 115 products, and a list of buyers did not indicate interest in seller 115 products. Buyers that have previously purchased products from seller 115 and buyers that have visited seller website 125 and expressed interest in products from seller 115 are referred to herein as "community members."

Seller portal 134 also provides mailing lists and email tools to seller 115 that enable seller 115 to contact community members using email. Seller portal 134 provides an authoring tool to write an email and to attach photos or web page links, and also enables seller 115 to select the email recipients. For example, seller 115 could use the mailing list to invite community members to visit seller website 125 to see his/her new creations, or to inform community members about an upcoming event or exhibition.

Using seller portal 134, seller 115 may flexibly change, update and reconfigure the various products that he/she sells via seller website 125. Seller 115 may add new products and product options at any time and existing products and product options may be deleted at any time. Every time dynamic page analyzer 605 generates a dynamic cart that provides product options for buyer 105 to select it checks the latest capabilities and services. Deleted choices are automatically removed; thus, deleted choices are not included in the dynamic cart and buyer 105 does not see them.

EDECS server uses web services 625 to provide a buyer portal 132 that enables buyer 105 to log in and track his/her orders. Buyer portal 132 also acts as a public website that enables visitors and potential buyers to browse, search for, and purchase creations from the various blogs and websites served by EDECS 100. In this regard, buyer portal 132 maintains a catalog of creations served by EDECS 100 and enables buyer 105 to (1) view sorted lists of creations based on inter alia sales rank and popularity, (2) search the catalog using inter alia keywords, and (3) navigate the catalog using inter alia sellers' names and sellers' website names to find certain items. Selecting a creation name, a seller's name, or a seller website name causes the web browser running in buyer computer 110 to redirect to seller website 125.

Seller portal 134 enables seller 115 to create an account with EDECS 100 by going through a registration process. The registration process enables seller 115 to provide a unique username and password, his/her contact information and method payment information that enables EDECS 100 to make electronic payments to seller 115 for his/her share of the proceeds for sales of his/her creations or for sales of products based on his/her commissions. The portion of each sale to be paid to seller 115 is specified in a seller agreement that is agreed to during the registration process.

Seller portal 105 uses back office and business logic component 630 to store seller information in seller database 631, including the information provided by seller 115 during the registration process, a URL for seller website 125, and to assign and store a unique seller ID, referred to as a site key, for each new seller 115. Seller portal 620 provides seller 115 a web page where he/she can pick colors, fonts, and other elements of style for the buy and share toolbar, and generates a widget embedding script for seller website 125. Seller portal 134 offers an option to automatically pick a style. To automatically generate a style, seller portal 134 crawls seller website 125 and extracts information about the visual style of the website from its in-line styles such as font and color definitions or its Cascading Style Sheet (CSS) files. Thus, EDECS 100 enables seller 115 to add e-commerce without changing the overall style of seller website 125. As described with reference to FIG. 4A, seller portal 134 enables seller 115 to configure rules that are then used by dynamic page analyzer 605 to identify the items for sale on a web pages.

Widget Embedding Script

EDECS seller portal 134 generates a widget embedding script specific to seller website 125. The widget embedding script typically consists of several lines of JAVASCRIPT. Seller 115 obtains the widget embedding script from EDECS seller portal 134 and inserts it into the HTML code of seller website 125 in a way that the widget embedding script is added to every web page on seller website 125 that displays a creation and offers e-commerce services.

There are many methods by which seller 115 may add the widget embedding script to his/her seller website 125. Although such methods are outside the scope of the invention several common methods are described below.

In a first method, seller 115 using opens the page or pages of seller website 125 that display items for sale, and copies and pastes the widget embedding script into those pages. The text can be added anywhere on the page as long as it is outside of other scripts, and it does not break the HTML syntax of the page. The best practice is to add the text closer to the bottom of the page, before the HTML </BODY> tag. Typically, seller 115 uses a text editor or a web page editing program to insert the.

In a second method, if seller website 125 uses a template in such a way that a common file is included in various pages of the site, for example a file that generates the footer for all of the pages of the site, then seller 115 adds the widget embedding script to such file. The result is that the widget embedding script is automatically included in all web pages that use the common file. The text can be added anywhere in such common file as long as it is outside of other scripts, and it does not break the HTML syntax of the page.

In a third method, an EDECS plugin or add-on may be created and used with certain publishing or content management system (CMS) platforms. Such an EDECS plugin or add-on would insert the widget embedding script into the proper locations in a websites managed by the publishing or CMS platform. Publishing or CMS platforms support plugins or add-ons include Wordpress, PixelPost, MovableType, Joomla, and Drupal. An EDECS plugin for any of these platforms simply provides a way to enter a site key instead of the widget embedding script, and it uses the site key to generate the widget embedding script and add it to all or some of the web pages managed by such publishing platform. The function of the plugin or add-on is to take the site key provided by seller portal 134, add it to the rest of the widget embedding script, which is invariant except for the site key, and add the resulting widget embedding script to the correct pages of seller website 125, i.e. those web pages that incorporate images that either represent digital media items to be used to create a product or which represent products themselves.

Each of the three abovementioned methods for adding widgets to a web page are common practice and are thus familiar to website and blog creators. Seller 115 does not need to have sophisticated technical programming knowledge to use any of these methods.

Once embedded in a web page, when buyer 105 visits seller website 125, the widget embedding script is executed as part of the web page provided by web services 625. An example of a typical widget embedding script is provided below

```
<script type="text/javascript"
    src="http://widget.edecs.com/stores/script/
    e79daf52e7f09ec39d8892341fab991c7b84814a.js">
</script>
```

As shown in the above example, the widget embedding script references a specific program that resides on the EDECS server 130. When the widget embedding script is included in an HTML page and executed by a web browser running in buyer computer 110 it instructs the web browser to send an HTTP request and fetch the referenced client-side script, dynamic page analyzer 605, and then to execute it.

The name of the client-side script has the form "<site key>.js" where site key is the site key stored in seller database 631. The EDECS server 130, upon receiving the HTTP request, looks up the site key in seller database 431, and uses it to determine which seller 115 and which seller website 125 it belongs to. Also, for purposes of security, it looks up the HTTP_REFERRER of the HTTP request to see what domain the request has come from. If the domain of the web server that sent the HTTP request (based on HTTP_REFERRER) does not match the domain of seller website 125 the request is denied. Otherwise, the EDECS server 130 determines that this is a legitimate request. Then, the EDECS server 130 looks up the site key in product database 633 to obtain a list of what products seller website 125 offers. Then, EDECS server 130 adds the list of the products to dynamic page analyzer 605, and sends it back to the web browser.

Dynamic Page Analyzer

Figure 7:
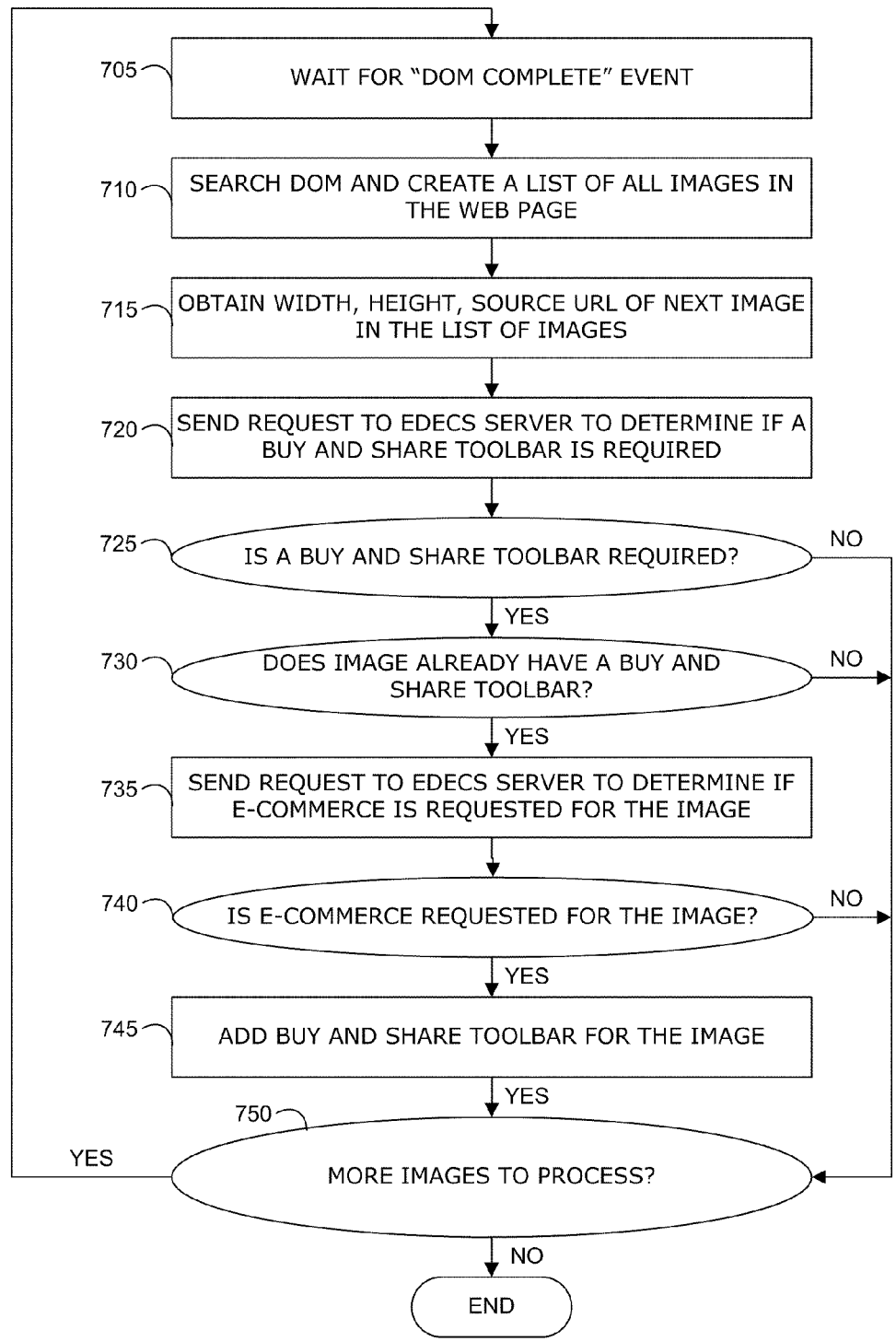
FIG. 7 is flow diagram that describes the processing performed by a page analyzer to determine if a buy and share toolbar should be placed next to an image on a seller website and if so, where to place the buy and share toolbar, in accordance with an embodiment of the present invention.

Now reference is made to FIG. 7, which is flow diagram that describes the processing performed by a page analyzer to determine if a buy and share toolbar should be placed next to an image on a seller website and if so, where to place the buy and share toolbar, in accordance with an embodiment of the present invention.

As previously discussed, the widget embedding script instructs the web browser running in buyer computer 110 to send an HTTP request to EDECS server 130 for dynamic page analyzer 605. In response, EDECS server 130 sends dynamic page analyzer 605 to buyer computer 110 in an HTTP response message. The web browser running in buyer computer 110 then executes dynamic page analyzer 605, which is a client-side script. Dynamic page analyzer 605 examines the Document Object Model (DOM) for the web page in order to determine the location of and to place instances of buy and share toolbar 204 within the web page.

By way of background, once a web page is completely downloaded by a web browser, even if external objects such as images and scripts are being downloaded in parallel or client-side scripts are executing, the web browser creates a Document Object Model, or DOM, which is a data structure that reflects the hierarchy of the HTML elements that belong to this page. The DOM describes all of the HTML elements in the page and how they are related, including any images or videos or text that represent the content of the page. The DOM is specified by the World Wide Web Consortium as part of the specification for the hypertext markup language (HTML). There are standard software libraries that enable client-side scripts to traverse or analyze a DOM and to search for certain elements. Once the DOM has been constructed by the web browser, which, as mentioned, does not necessarily mean that elements of the page have been downloaded, the web browser fires an event indicating that the DOM is ready. Such event can be received by a client side script such as dynamic page analyzer 605.

Now referring to FIG. 7, at step 705, initially, dynamic page analyzer 605 waits for a "DOM complete" event to be indicated by the web browser running in buyer computer 110. One method to accomplish this is for dynamic page analyzer 605 to schedules itself to run at a later time, using a timer, if the event has not occurred. Such timers exist in all client-side scripting languages. An example client-side script written in JAVASCRIPT is presented below. In the example, dynamic page analyzer 605 determines if the DOM has been constructed yet and if not, instructs the web browser to call dynamic page analyzer 605 again 500 milliseconds later.

```
function runInit(site_key)
{
    still_initialzing = getEvent(DOM_LOAD);
    if (still_initializing) {
        init_timer = setTimeout(
            function( ) {FOTOMOTO.runInit( );}, 500
    );
    }
}
```

When the DOM has been constructed, at step 710 dynamic page analyzer 605 continues execution and searches the DOM and creates a list of all images in the web page. Typically, dynamic page analyzer 605 uses a DOM manipulation library such as the Yahoo! User Interface Library (YUI) library, from Yahoo! Inc. of Sunnyvale, Calif. However, any DOM manipulation library can be used for this purpose. In the following code example, YUI is used to search the DOM and create a list of the images, named image_list, on the web page.

```
var image_list = YUI.util.Dom.getElementsBy(function(el){
    return EDECS.validateImage(el);
}, "img");
```

Image_list is an array of HTML elements. The elements that are stored in image_list are image properties including width, height, and the location of the image, i.e. the source URL.

Next, dynamic page analyzer 605 sequentially processes each image in the in the image list and determines for each image if an instance of buy and share toolbar 204 must be added to the image and if so adds an instance of buy and share toolbar 204 in the proper location inside the HTML web page. The code example below provides the core algorithm for this processing routine.

```
for (var i=0; i<image_list.length; i++) {
            var image = image_list[i];
            var w = image.width;
            var h = image.height;
      var url = image.src;
      if (EDECS.ignoreImage(site_key, w, h, url))
         continue;
      if (hasToolbar(image))
         continue;
      imageAvailability = EDECS.getImageAvail(site_key, url);
      if (imageAvailability.isSoldOut)
         continue;
      if (imageAvailability.isNotForSale)
         continue;
      imageProducts = EDECS.getImageProducts(site_key, url);
      EDECS.addToolbar(image, imageProducts);
   }
```

At step 715 dynamic page analyzer 605 first obtains the width and height of the image, as well as its source URL, and passes them as parameters to the "ignoreImage" function. Next, at step 720 dynamic page analyzer 605 sends an HTTP request to EDECS server 130, including the site key and image URL as parameters, requesting that EDECS server 130 determine if the image needs to have an instance of buy and share toolbar 204 displayed next to it. At step 725 EDECS server 130 determines if an instance of buy and sell toolbar 204 is required. It does this by determining if seller 115 has configured any parameters using seller portal 420, as discussed with reference to FIG. 4A, that would indicate that no buy and share toolbar 204 should be added next to the image. If no instance of buy and share toolbar 204 is required then processing continues at step 750.

If an instance of buy and share toolbar 204 is to be added next to the image, then, at step 730 dynamic page analyzer 605 determines if the image already has an instance of buy and share toolbar 204, i.e. whether the code to display buy and share toolbar 204 next to the image has already been added to the web page. If an instance of buy and share toolbar 204 has already been added to the web page, then processing continues at step 750.

At step 735, dynamic page analyzer 605 sends an HTTP request to EDECS server 130 to determine if e-commerce is requested for the image by seller 115. As discussed with reference to FIG. 4A, seller 115 may use seller portal 420 to specify that e-commerce is not to be provided relative to an image. At step 740 EDECS server 130 determines if seller 115 has requested e-commerce for the image. If seller 115 has specified that e-commerce not be provided for the image then processing continues at step 750.

If e-commerce service is to be provided for the image then, at step 745, dynamic page analyzer 605 calls the addToolbar( ) function to add the toolbar to the image. The addToolbar( ) function, which is part of dynamic page analyzer 605 generates the web page code, including HTML and any client-side scripting code required, to add an instance of buy and share toolbar 204 next to an image. The method used by the addToolbar( ) function to add an instance of buy and share toolbar 204 next to an image is described below.

Finally, at step 750 dynamic page analyzer determines if there are more images in the list of all images in the web page to process. If there are images remaining to process then processing resumes at step 705. If there are no further images to process the method terminates.

Adding a Buy and Share Toolbar Next to an Image

When the addToolbar( ) function is executed to add buy and share toolbar 204 next to an image, it first determines whether seller 115 has customized the location of buy and share toolbar 204. Customizing the location of the buy and share toolbar 204 can be done by adding optional HTML DIV elements to the page. The seller 115 can add an HTML DIV tag to the web page, with a unique HTML ID known to the EDECS server, such as <div id="EdecsToolbar"></div>. The dynamic page analyzer 605 inserts buy and share toolbar 204 inside this HTML DIV. This allows the seller to specify the location of buy and share toolbar 204 on the web page.

Seller 115 can provide "hints" about the location of buy and share toolbar 204 by setting customization controls provided by seller portal 134. EDECS server 130 then sends these hints to dynamic page analyzer 605. These hints are parameters stored in the seller database 631 for seller website 125, and are fetched by dynamic page analyzer 605 from EDECS server 130 using an HTTP request/response exchange. These parameters allow the seller 115 to specify inter alia that (1) buy and share toolbar 204 should be inserted above, below, or on (overlapping) the photo, (2) buy and share toolbar 204 should be centered, or left justified or right justified with respect to the photo.

Dynamic page analyzer 605 uses the previously discussed YUI library to traverse and search the HTML elements of the web page to see if the DIV for customizing the location of buy and share toolbar 204 already exists. If not, then dynamic page analyzer 605 automatically determines where to add buy and share toolbar 204 relative to each image, and in doing so applies the hints described above. While automatically determining, dynamic page analyzer 605 creates new DIV elements, one for each image it finds in the DOM, so that there is one buy and share toolbar 204 for each image. Dynamic page analyzer 605 generates unique HTML IDs for each such DIV in the form of <div id="EdecsToolbar XXXXXX"></div> where XXXXXX is different for each image.

As shown in the example code below, dynamic page analyzer 605 fetches the hints along with other configuration information from EDECS server 130. This configuration is shown as EDECS_CONFIG in the example code. Dynamic page analyzer 605 creates a DIV element for the buy and share toolbar 204 of the image. The variable box_list_hint is a list of HTML elements that dynamic page analyzer 605 traverses "outwards", to place the buy and share toolbar one or more boxes "outer" than the actual image. It can contain the name of the element (such as p for paragraph, or div for a DIV), or the class of the elements, or the ID of the elements.

An example implementation of how dynamic page analyzer 605 determines where to add the buy and share toolbar 204 using JAVASCRIPT is provided below.

```
this.toolbar = document.createElement("div");
this.bar_id = "EdecsToolbar_"+this.id;
var box_list = EDECS_CONFIG.box_list_hint;
var img_box = this.image;
for (var i=0; i<box_list.length; i++) {
      var box = this.image;
      var list = box_list[i].split(" ");
      for (var j=0; j<list.length; j++) {
            if (/^#/.test(list[j])) { // id of element
```

-continued

```
                box =
YUI.util.Dom.get(list[j].replace(/^#/,""));
                        } else if (/^\./.test(list[j])) { // class of
element
                box =
YUI.util.Dom.getAncestorByClassName(box,
            list[j].replace(/^\./,""))
                        } else { // name of element
                box =
YUI.util.Dom.getAncestorByTagName(box, list[j]);
                        }
                        if (!box)
    break;
                }
                if (box) {
                        img_box = box;
                        break;
                }
        }
}
```

The code above traverses the DOM, from the image outward, to find the right "img_box", which is treated by dynamic page analyzer 605 as the "final box for the image" where buy and share toolbar 204 should be added. Once this box is known, dynamic page analyzer 605 uses the toolbar_position_hint to add buy and share toolbar 204 above, below, or over the image. Adding buy and share toolbar 204 means dynamically adding a new HTML element to the page, which is achieved by adding a new node to the DOM data structure at the right place. This is performed using the YUI library as follows:

```
if (typeof(EDECS_CONFIG.toolbar_position_hint)!="undefined")
{
        this.toolbar_position =
EDECS_CONFIG.toolbar_position_hint;
} else {
        this.toolbar_position =
EDECS_CONFIG.DEFAULT_POSITION;
}
if (img_box) {
        switch (this.toolbar_position) {
        case "1": //top position: toolbar showing above
photo
                YUI.util.Dom.insertBefore(this.toolbar,
img_box);
                break;
        case "2": //overlay position: toolbar showing over
the photo
                insertOverlay(this.toolbar, img_box);
                break;
        case "0": // bottom position: toolbar showing below
photo
        default:
                YUI.util.Dom.insertAfter(this.toolbar,
img_box);
                if (siblingImage)
YUI.util.Dom.insertAfter(document.createElement("br"),
        this.toolbar);
        }
}
```

Thus, buy and share toolbar 204 is added to the DOM and therefore to the web page. Buy and share toolbar 204 appears when the web browser renders the web page to the display of buyer computer 110.

Figure 8:
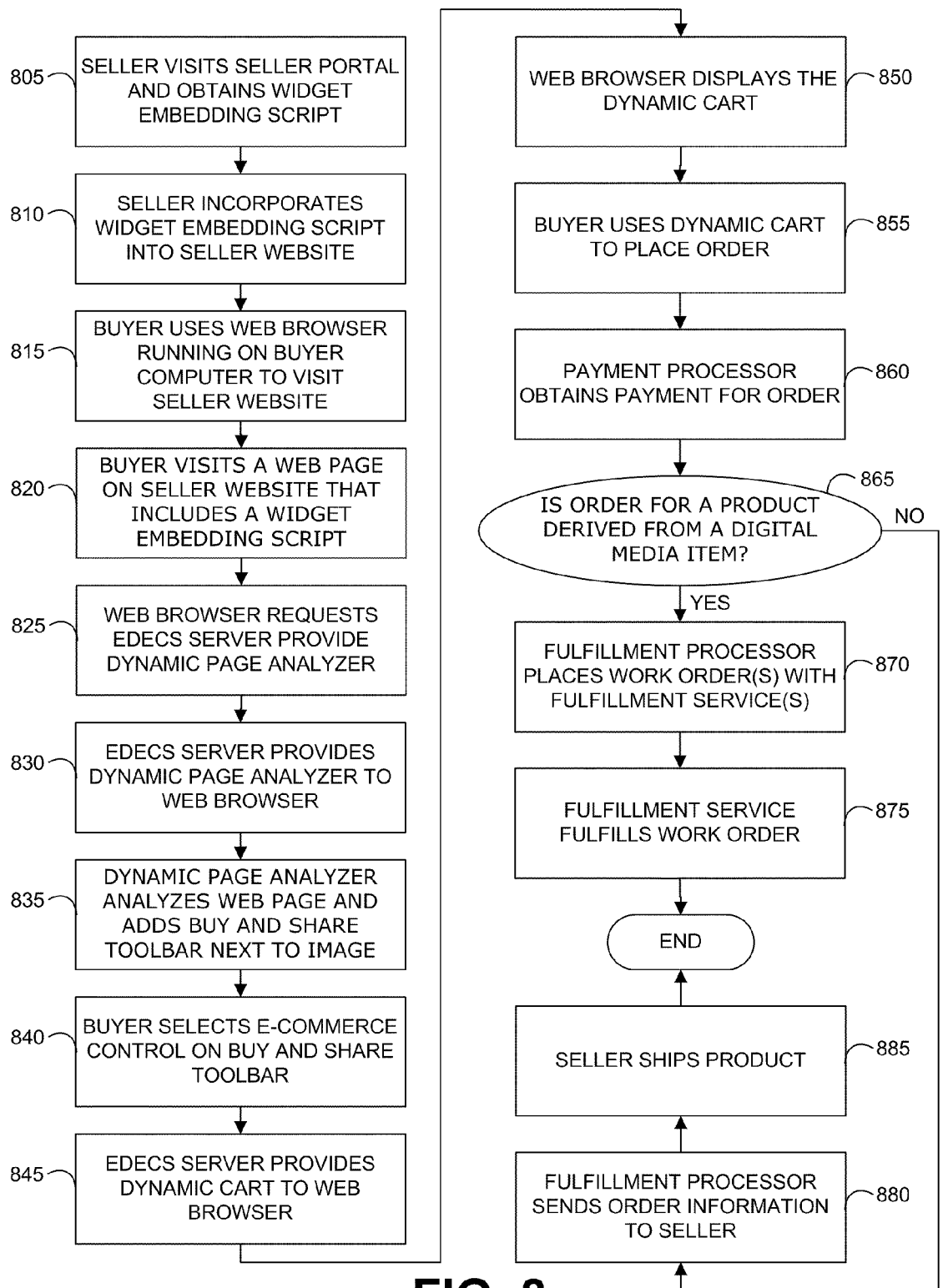
FIG. 8 is a flow diagram of an overall method used to purchase a product using an embeddable distributed e-commerce and community building system (EDECS), in accordance with an embodiment of the present invention.

Now reference is made to FIG. 8, which is a flow diagram of an overall method used to purchase a product using an embeddable distributed e-commerce and community building system (EDECS), in accordance with an embodiment of the present invention. At step 805 seller 115 uses his/her browser, running on seller computer 120 to visit seller portal 134. If seller 115 is not already registered as a seller with EDECS 100 then seller portal 134 enables seller 115 to register. If seller 115 is already registered, then seller 115 simply signs in. Upon registration or sign-in, seller 115 provides the URL of seller website 125 to seller portal 134 and seller portal 134 generates an appropriate widget embedding script for seller website 125.

At step 810 seller 110 incorporates the widget embedding script into seller website 125 in such a way as to be embedded in the HTML code for every page that displays a creation that seller 110 wishes to obtain e-commerce service for using EDECS 100. Typically, one way to do this is to copy the widget embedding script into a template that defines the look, feel, and function of each web page that displays a creation. As previously discussed, a creation may be inter alia a digital media item that will be used to create a product such as a print, or it may be a physical product itself that will be taken out of stock and shipped.

At step 815 buyer 105 uses his/her web browser, running on buyer computer 110, to visit seller website 125. At seller website 125, buyer 105 browses, searches for, and reviews information about various creations. At step 820 buyer 105 visits a web page on seller website 125 that includes a widget embedding script. At step 825, when the web browser executes the widget embedding script it causes the web browser to send a message to EDECS server 130 requesting that EDECS server 130 provide dynamic page analyzer 605. At step 830 EDECS server 130 provides dynamic page analyzer to the web browser running in buyer computer 110.

At step 835 dynamic page analyzer 605 analyzes the web page and adds instances of buy and share toolbar 204 as required to the web page. The placement of the buy and share toolbar 204 relative to each image that displays a creation may be customized by seller 115 using seller portal 134.

At step 840 buyer 105 selects an e-commerce control on the buy and share toolbar 204 that is placed next to an image, where an e-commerce control is typically a request to purchase either a product incorporating the media item represented by the image or a product depicted in the image. Typical such requests include buy a print, buy a card, buy the product. Selecting an e-commerce control causes the web browser running in buyer computer 110 to create and send an HTTP message to EDECS server 130 requesting a dynamic cart. In response, at step 845 EDECS server 130 provides a dynamic cart to the web browser. Then at step 850 the web browser displays the dynamic cart inside the currently displayed web page. The dynamic cart is a client-side script that when executed by the web browser creates an interactive shopping cart appropriate to the product selected for purchase within the currently displayed web page. Thus, buyer 105 does not have to leave the web page in order to engage in e-commerce for a media item or product depicted on the web page.

At step 855 buyer 105 uses the dynamic cart to specify an order. This step includes selecting any options such as quantity and size, checking out, providing a shipping address, selecting a shipping method, selecting a payment method, and providing method of payment information. When the user finishes specifying the order, the web browser sends a message to EDECS server 130 that includes the order information. In one embodiment, back office and business logic component 630 notifies seller 115 when an order for one of their creations is placed. Seller 115 can track the status of the order using features provided by seller portal 134.

At step 860 payment processor 645 obtains payment for the order from payment processing service 135. For each payment collected, back office and business logic component 630 credits a portion of the sales amount to a seller account for seller 115.

At step 865 back office and business logic component 630 determines if the order is for a product derived from a digital media item such as a printed digital image or a card that includes a printed version of a digital image. If so, then processing continues at step 870. If not, then the order is for a product depicted by an image, rather than a product that incorporates the image, and processing continues at step 880.

At step 870 EDECS server 130 uses fulfillment services processor 640 to place work orders with at least one fulfillment service 140. At step 875, the at least one fulfillment service 140 completes the work order and ships a completed product. The product may be shipped to buyer 105 or to another person designated by buyer 105 during the ordering process.

At step 880 EDECS server 130 sends order information to seller 115 notifying him/her that buyer 105 has placed an order for a product provided by seller 115. The order information includes shipping information and information about any product options selected by buyer 105. At step 885 seller 115 ships the ordered product to the designated product recipient at the designated shipping address.

Typically, EDECS server 130 will provide electronic updates to buyer 105 at one or more points during the fulfillment process. Typically, EDECS server 130 provides electronic updates via email messages when payment has been successfully obtained, when a work order has been placed with a fulfillment service 140, and when a fulfillment service 140 fulfills a work order and ships a completed product, when order information has been sent to seller 115 and when seller 115 ships a product.

Buyer 105 may visit buyer portal 132 to check the status of the order at any time.

Also, on a periodic basis, back office and business logic component 630 makes an electronic payment to seller 115 for the aggregated portion of sales credited to his/her seller account. Such electronic payments are typically performed monthly.

In reading the above description, persons skilled in the art will realize that there are many apparent variations that can be applied to the methods and systems described.

What is claimed is:

1. A method for embedding e-commerce and community building capability into an Internet-connected seller website hosted by a seller, comprising steps:
    (a) maintaining on an Internet-connected e-commerce server, separate from the seller website, a product database of products to be sold by a seller on the seller website;
    (b) incorporating a seller script that is executable in a web browser into at least one web page displaying at least one image representing a product offered for sale by the seller on the seller website, such that the script is executed each time the one or more web pages are opened in a browser application;
    (c) in response to a buyer, operating an Internet-connected computerized appliance separate from the seller website and the e-commerce server, using an Internet browser application, opening a web page on the seller website, downloading to the buyer's web browser upon execution of the seller script a dynamic page analyzer application from the ecommerce server;
    (d) executing the dynamic page analyzer application by the buyer's web browser, determining by functions of the dynamic page analyzer one or more images in the web page requiring an interactive toolbar, and adding an interactive toolbar in the web page proximate each image requiring an interactive toolbar, each interactive toolbar including at least one e-commerce control corresponding to a product;
    (e) requesting by the web browser, in response to selection of an e-commerce control from a toolbar by the buyer, that the e-commerce server provide a dynamic cart script to the buyer's web browser;
    (f) upon execution of the dynamic cart script by the buyer's web browser, displaying a dynamic cart that enables the buyer to interactively specify an order for the product corresponding to the e-commerce control and to the image corresponding to the toolbar; and
    (g) sending the specification of the order to the e-commerce server for fulfillment of the order.

2. The method of claim 1 further comprising:
    (h) maintaining a buyer database comprising records of buyers, each record including method of payment information; and
    (i) using the buyer's method of payment information to electronically obtain payment for the order.

3. The method of claim 1 further comprising sending, by the e-commerce server, the specification of the order to the seller of the product for fulfillment.

4. The method of claim 1 further comprising a seller portal that enables the seller to specify from a list of available products which products to enable the buyer to order.

5. The method of claim 1 further comprising:
    (h) maintaining a community database that stores information about buyers' interest in each product; and
    (i) enabling the seller to view information regarding buyers' interest in each product.

6. The method of claim 1 further comprising enabling the seller to specify whether a toolbar should be positioned above or below its corresponding image.

7. The method of claim 1 further comprising enabling the seller to specify a minimum image dimension such that no toolbar is added near images whose height or width is less than the minimum image dimension.

8. The method of claim 1 wherein each toolbar may further include a control to select the corresponding image as a favorite.

9. The method of claim 8 further comprising enabling a buyer to view information for each image the buyer has selected as a favorite.

10. The method of claim 8 wherein the buyer has an account at a social network site, further comprising adding a link in the buyer's account to each image the buyer selects as a favorite.

11. A system for embedding e-commerce and community building capability into a seller website, comprising:
    an Internet-connected e-commerce server executing coded intelligence from a non-transitory physical medium, the coded intelligence maintaining a product database of products to be sold by a seller;
    an Internet-connected seller website separate from the e-commerce server, having web pages displaying the products to be sold and incorporating a seller script that is executable in a web browser into at least one web page on the seller website, such that the script is executed each time the one or more web pages are opened in a browser application;
    an Internet-connected computerized appliance separate from the seller website and the e-commerce server, the computerized appliance operated by a buyer and executing a buyer's web browser;

a dynamic page analyzer application downloaded from the e-commerce server to a page of the seller web site in response to the buyer accessing the page causing the seller script to execute, the dynamic page analyzer determining images in the page requiring addition of an interactive toolbar, and adding an interactive toolbar proximate each such image, each toolbar including at least one ecommerce control corresponding to a product;

a dynamic cart script provided by the e-commerce server to the buyer's web browser, the dynamic cart script executed in response to the buyer selecting an e-commerce control in an interactive toolbar for a product, execution displaying to the buyer a dynamic cart that enables the buyer to specify an order for the product corresponding to the e-commerce control and to the image corresponding to the tool bar, the order sent to the e-commerce server for fulfillment.

12. The system of claim 11 further comprising the e-commerce server maintaining a buyer database comprising records of buyers, each record including method of payment information, and using the buyer's method of payment information to electronically obtain payment for the order.

13. The system of claim 11 further comprising a fulfillment processor sending the specification of the order to the seller of the product for fulfillment.

14. The system of claim 11 wherein the e-commerce server further comprises a seller portal for enabling the seller to specify from a list of available products which products to enable the buyer to order.

15. The system of claim 14 wherein the seller portal further enables the seller to specify whether a toolbar should be positioned above or below its corresponding image.

16. The system of claim 11:
wherein the e-commerce server maintains a community database that stores information about buyers' interest in each product and enables sellers to view information regarding buyers' interest in each product.

17. The system of claim 11 wherein the e-commerce server, through the seller portal, enables the seller to specify a minimum image dimension such that no tool bar is added near images whose height or width is less than the minimum image dimension.

18. The system of claim 11 wherein each toolbar may further include a control to select the corresponding image as a favorite.

19. The system of claim 18 wherein the e-commerce server, through the buyer portal, enables a buyer to view information for each image the buyer has selected as a favorite.

20. The system of claim 18 wherein the e-commerce server provides a link in a social network account belonging to the buyer to each image the buyer selects as a favorite.

* * * * *